Figure 1:
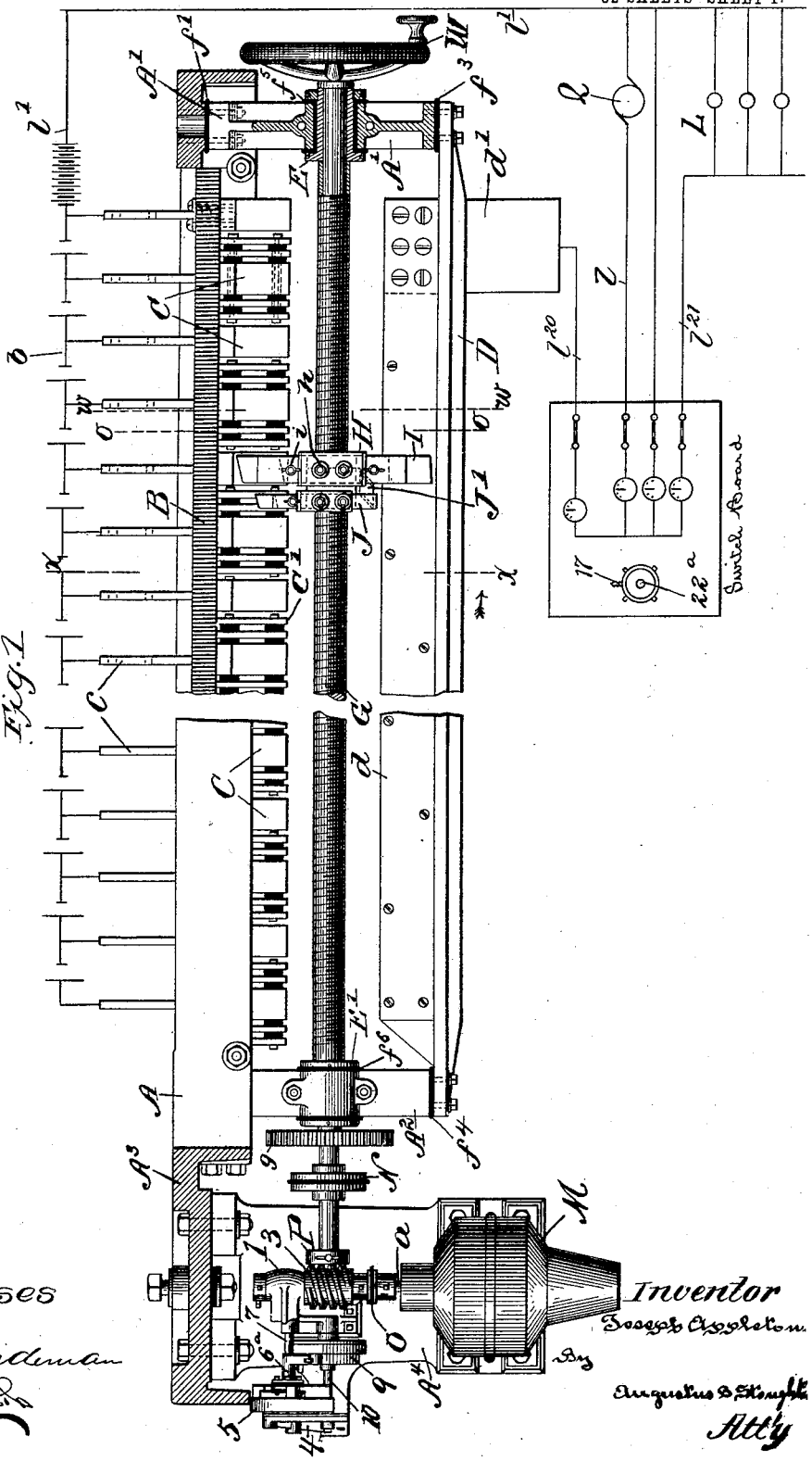

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 2.

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 5.

Witnesses

Inventor
Joseph Appleton
By Augustus S. Houghton
Atty

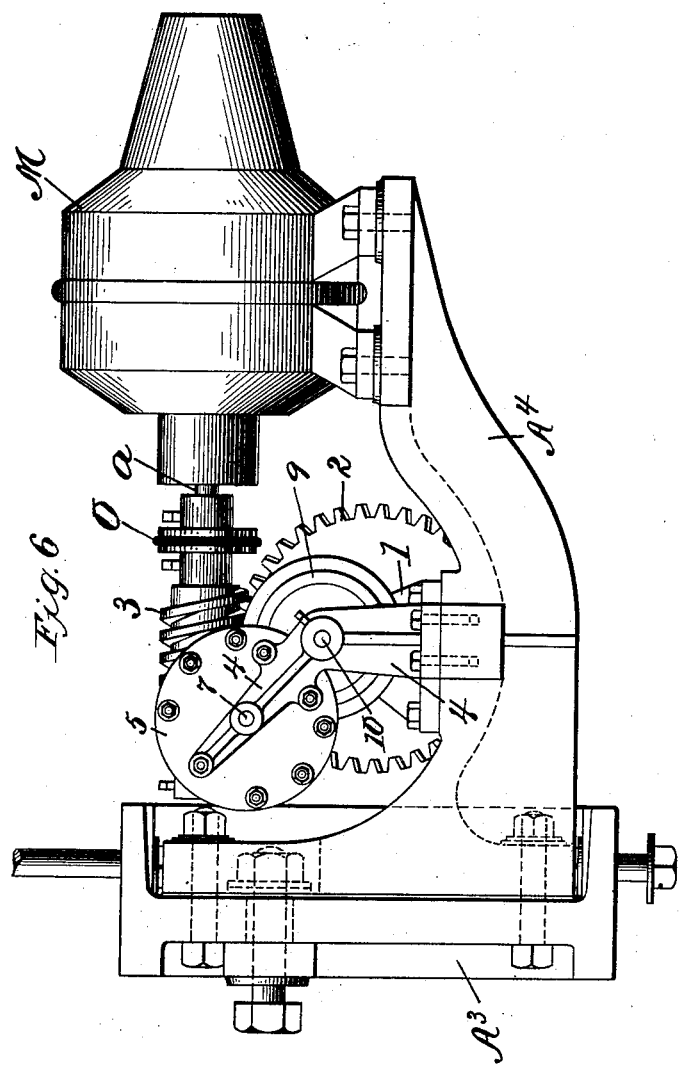

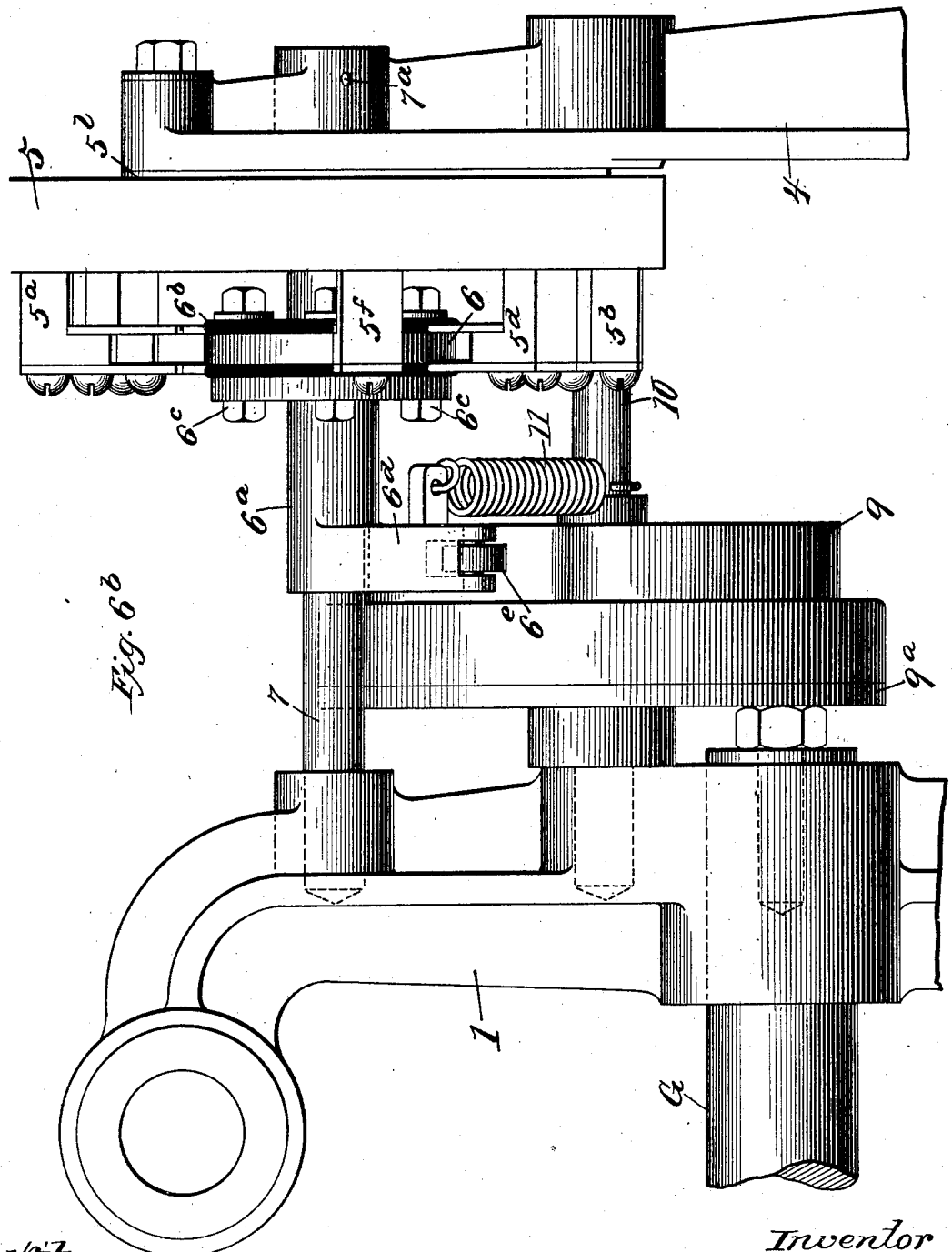

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 8.
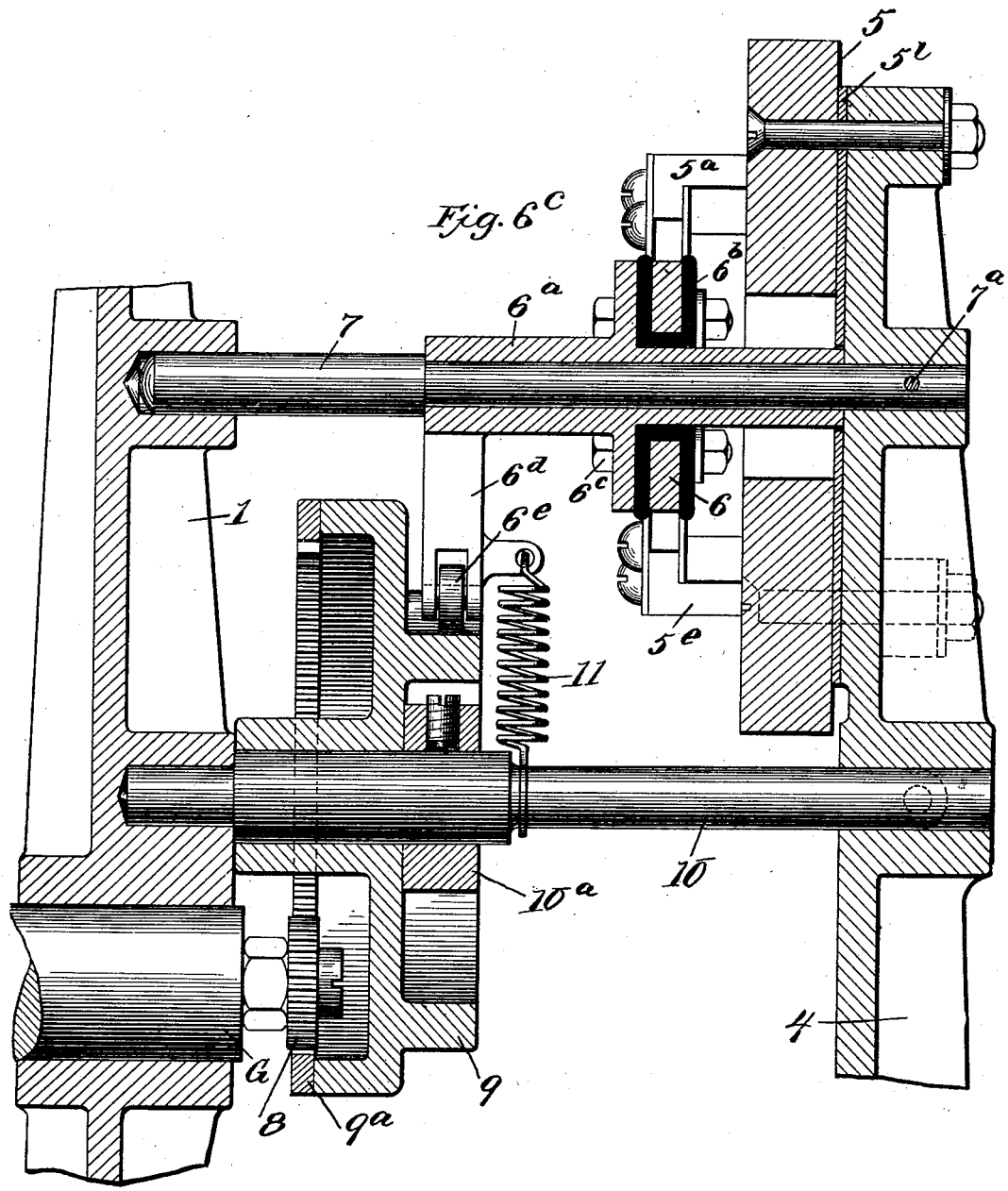

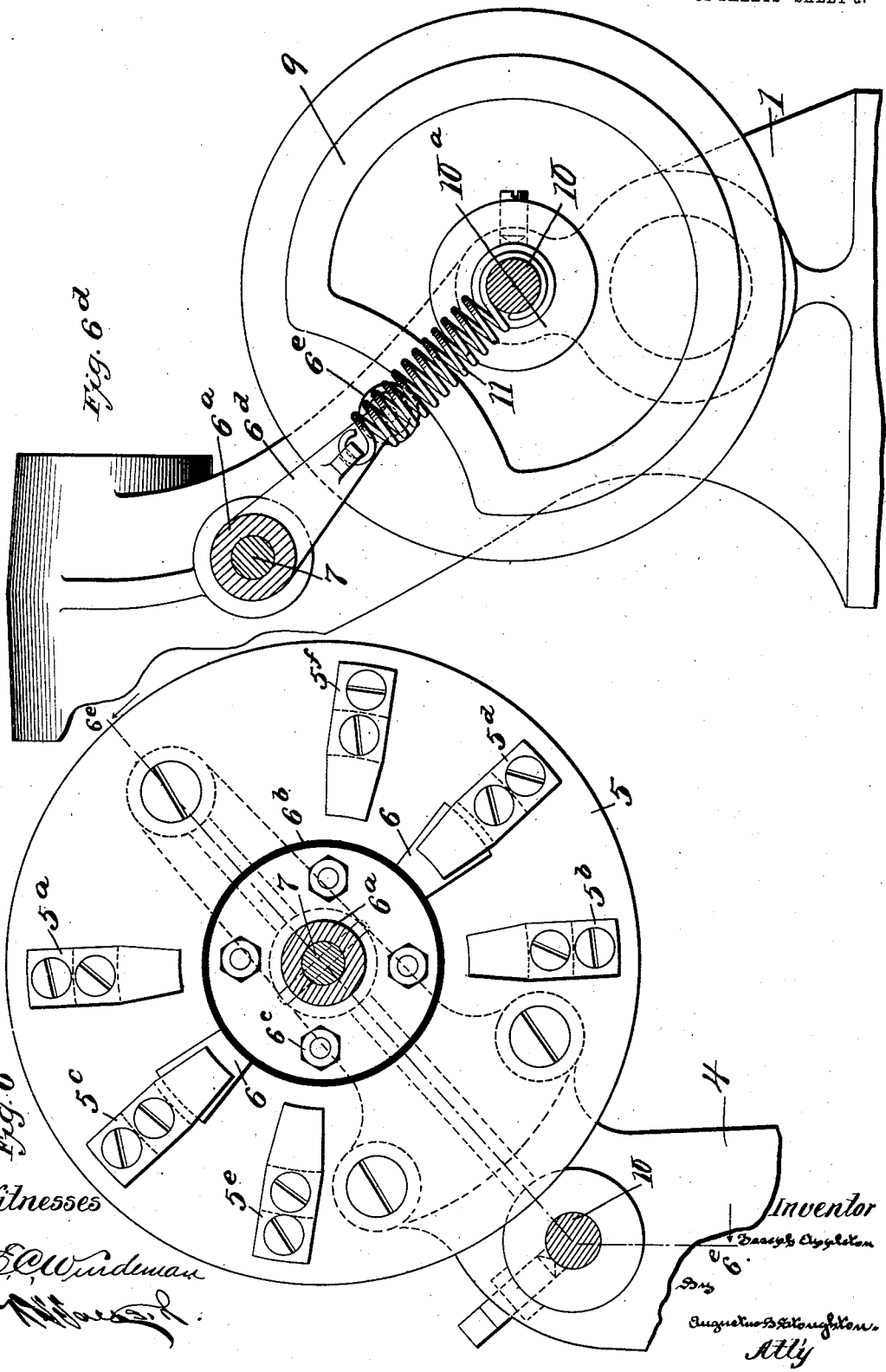

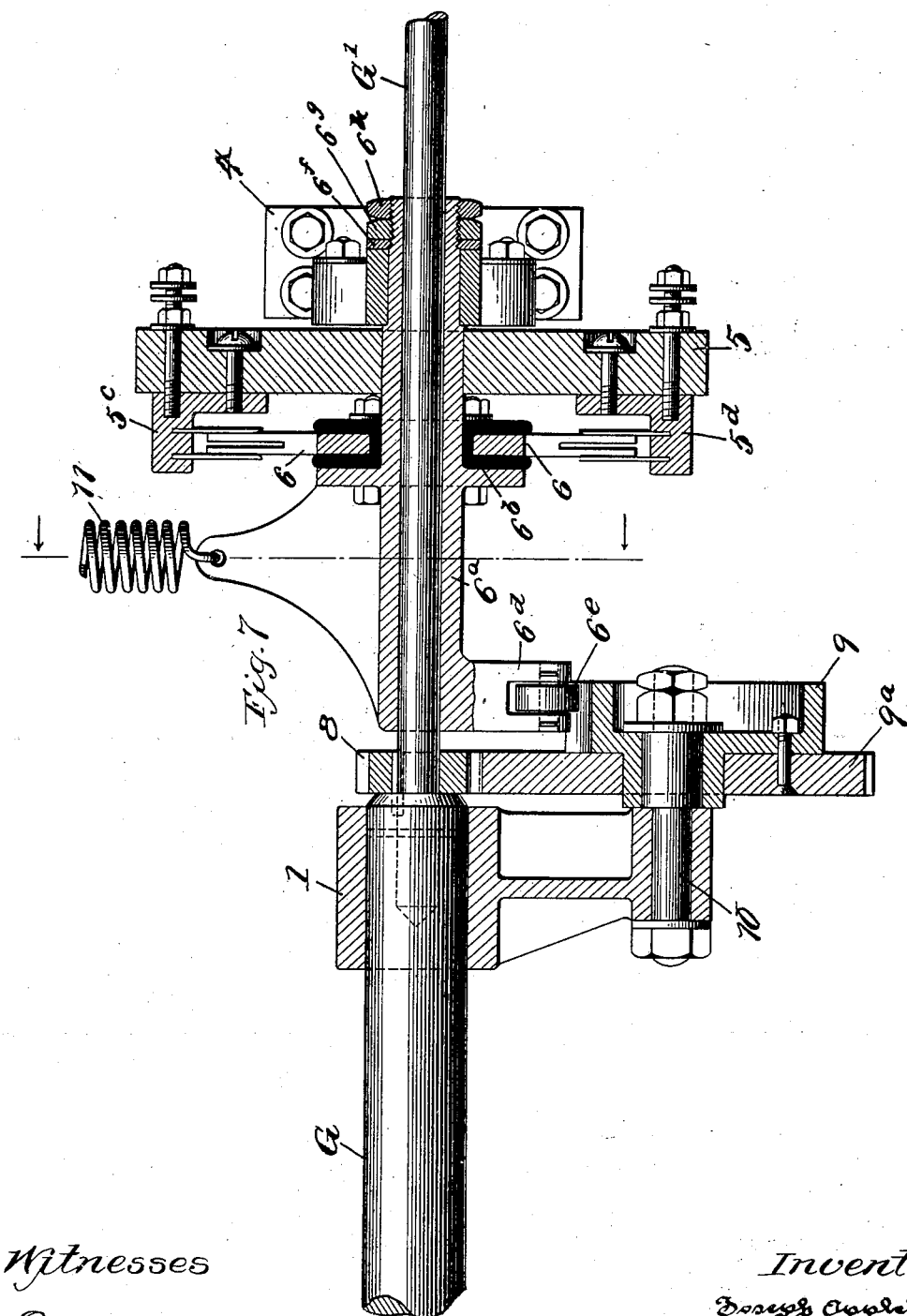

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 11.
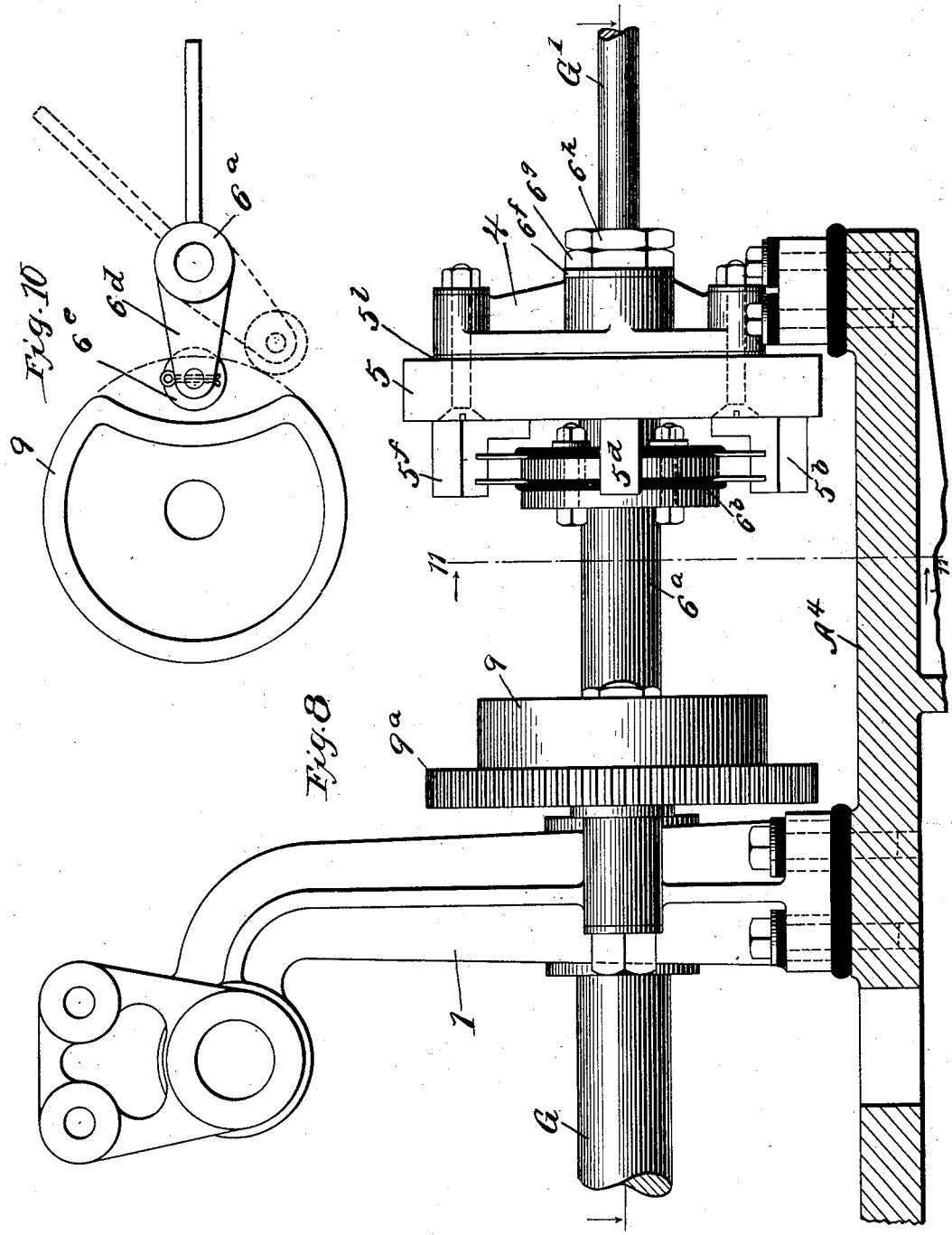
Witnesses
E. C. Wurdeman
Inventor
Joseph Appleton
By
Augustus D. Stoughton
Att'y No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 12.
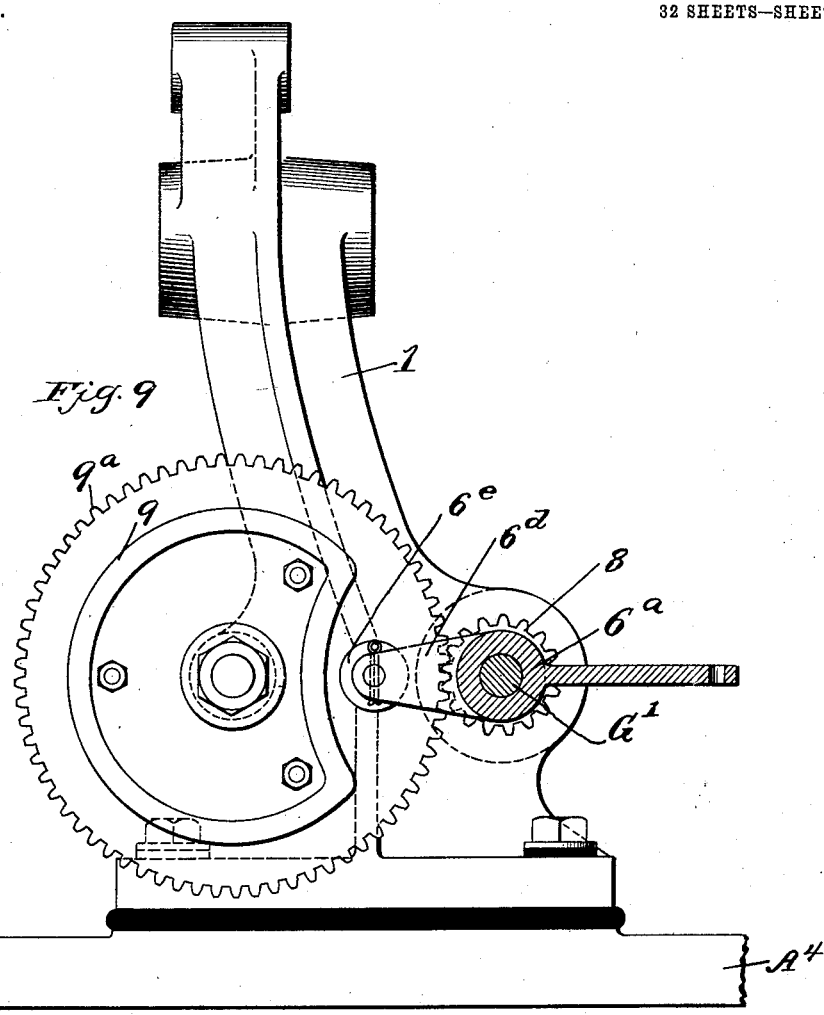
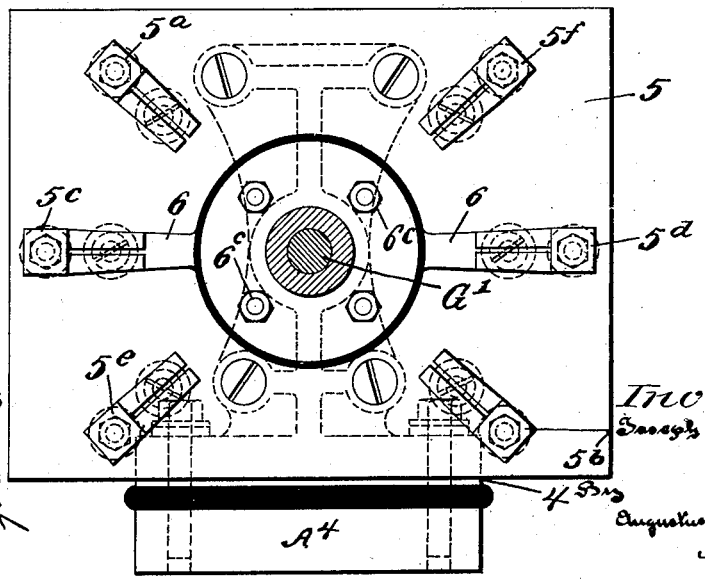
Witnesses
Inventor No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 13.
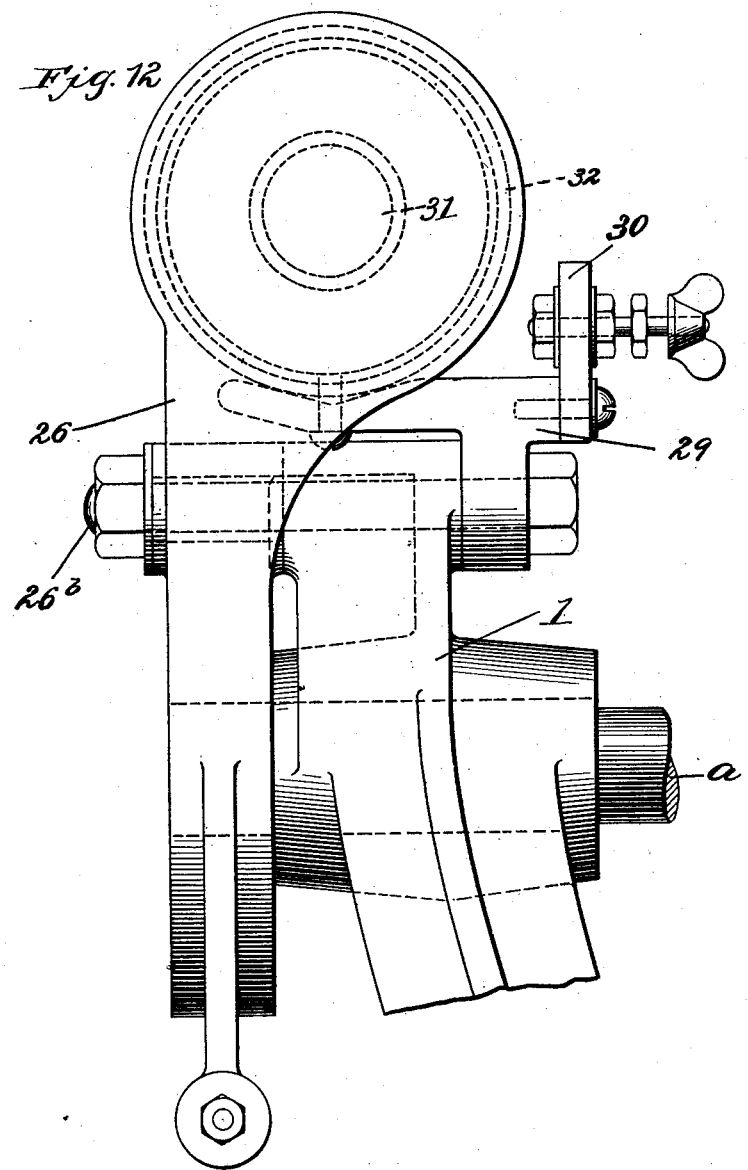
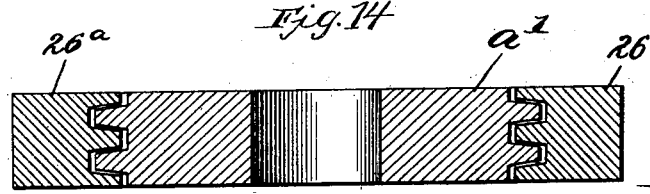

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 14.
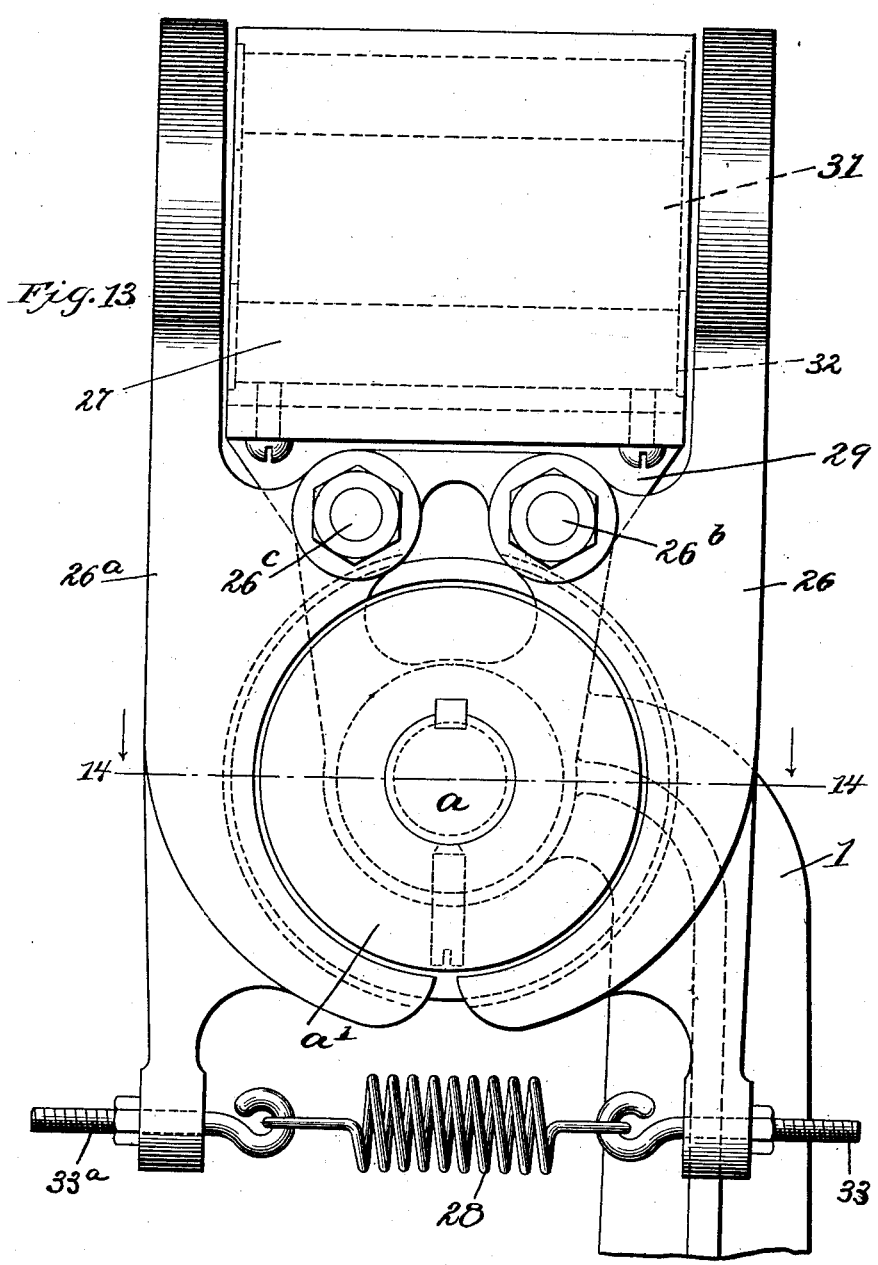
Witnesses
E.C. Wurdeman
Inventor
Joseph Appleton
By Augustus B. Stoughton
Att'y

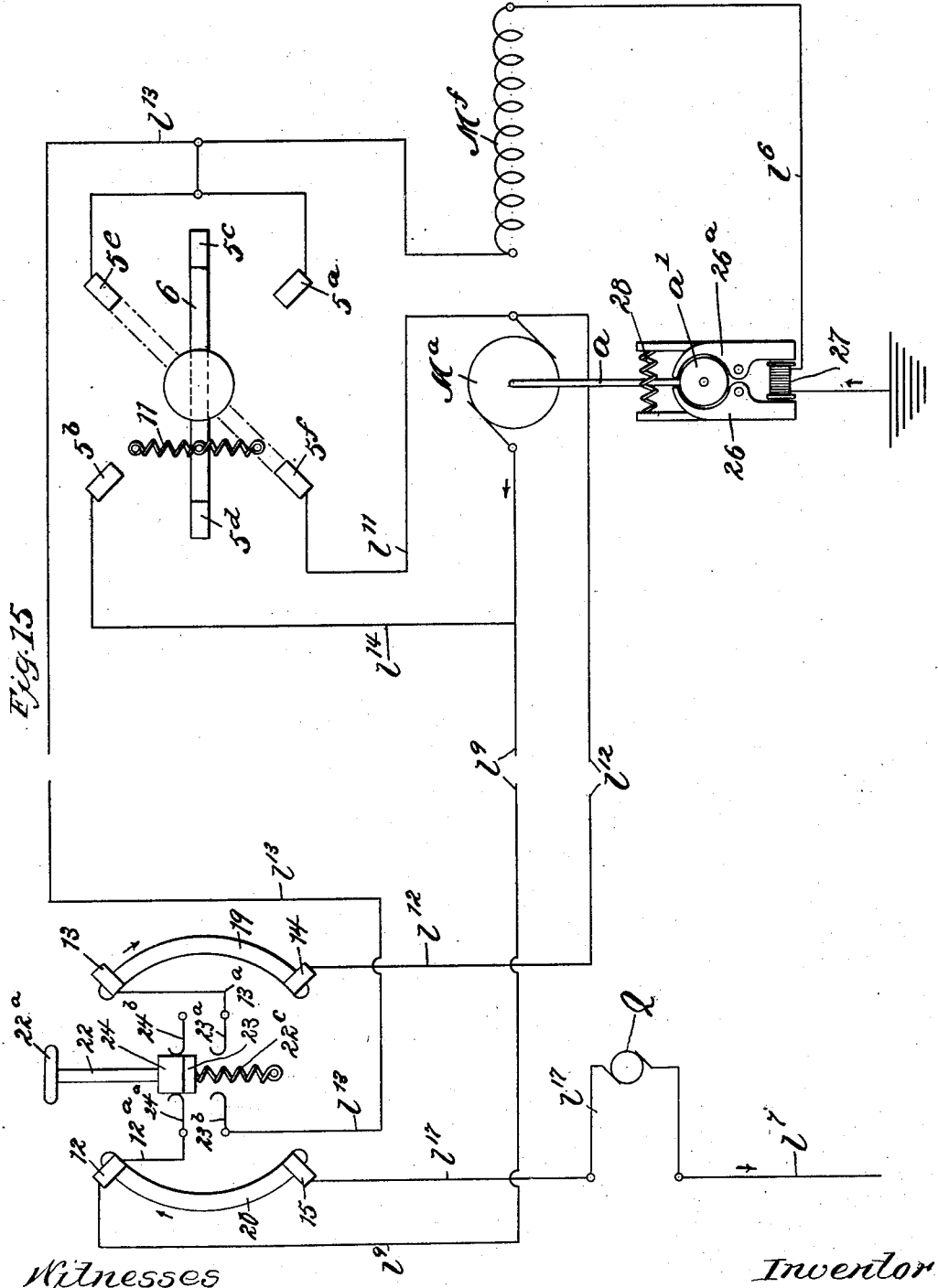

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 16.

Witnesses
E.C. Wurdeman

Inventor
Joseph Appleton
By Augustus B. Stoughton
Atty

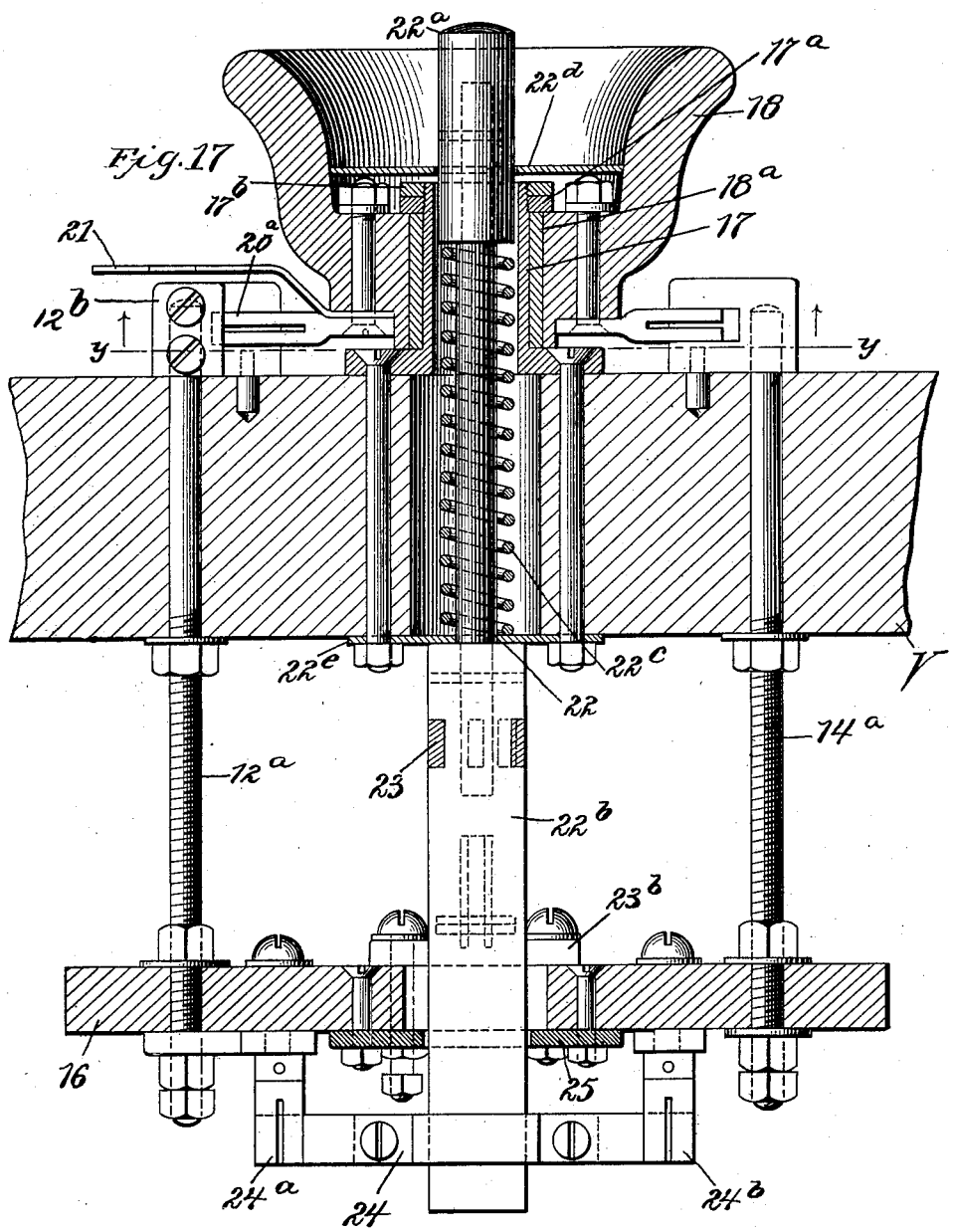

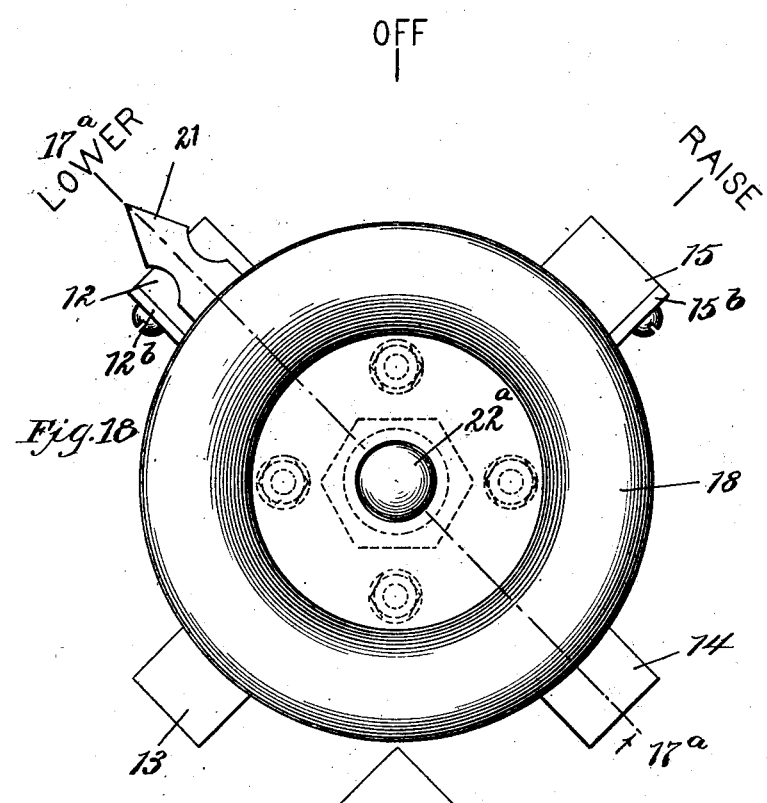
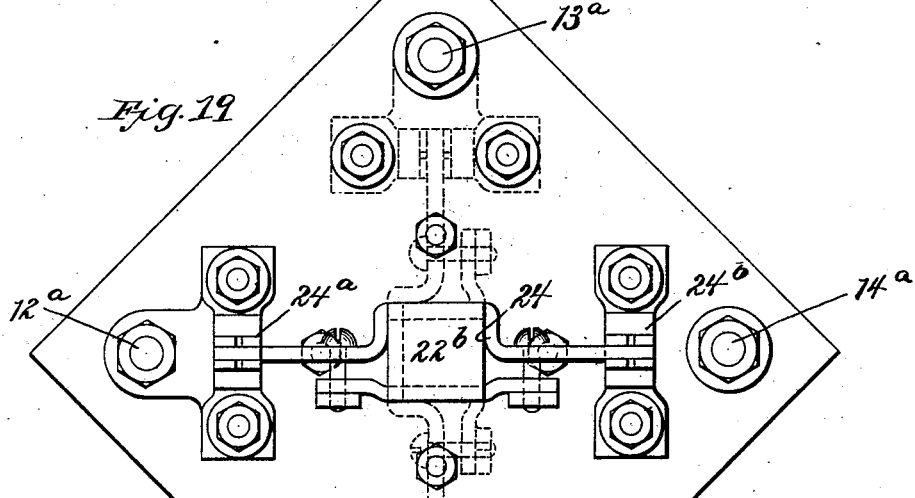

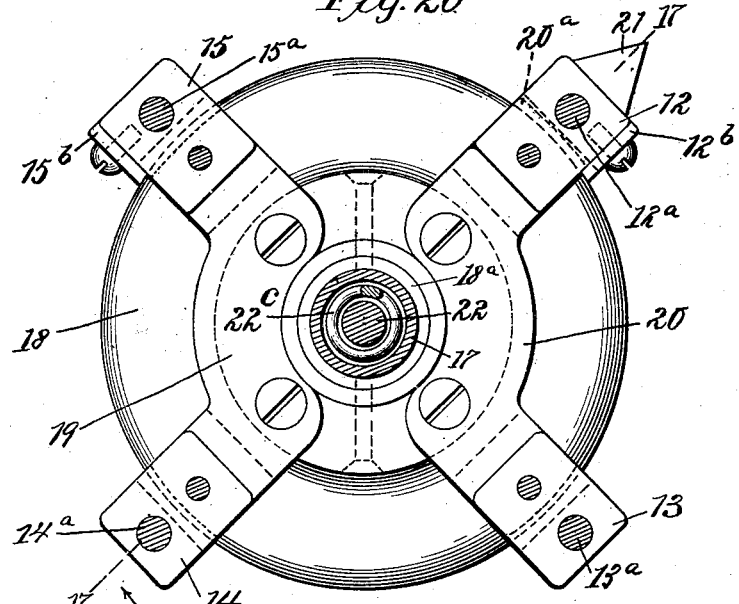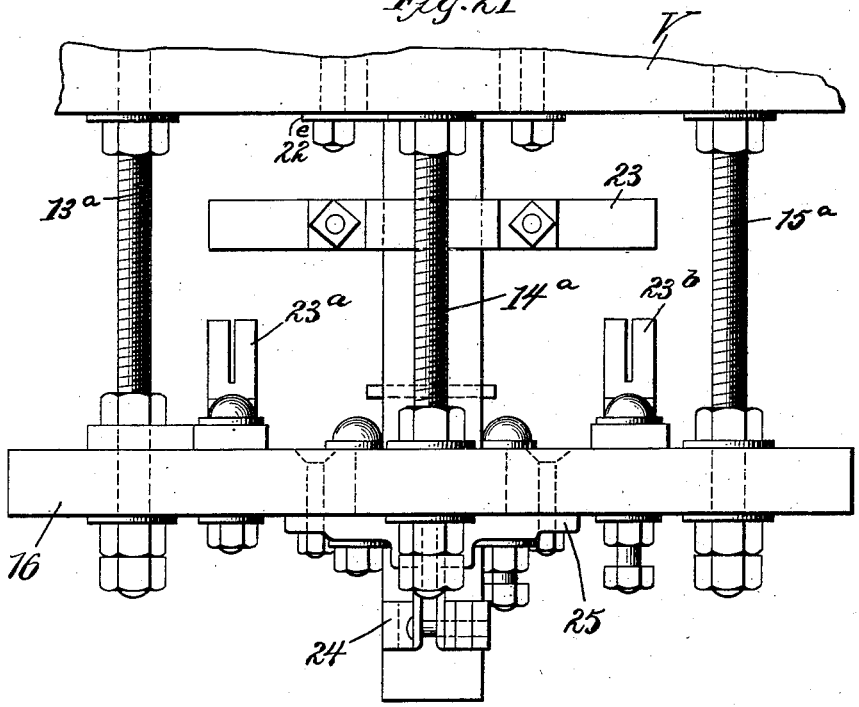

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 20.
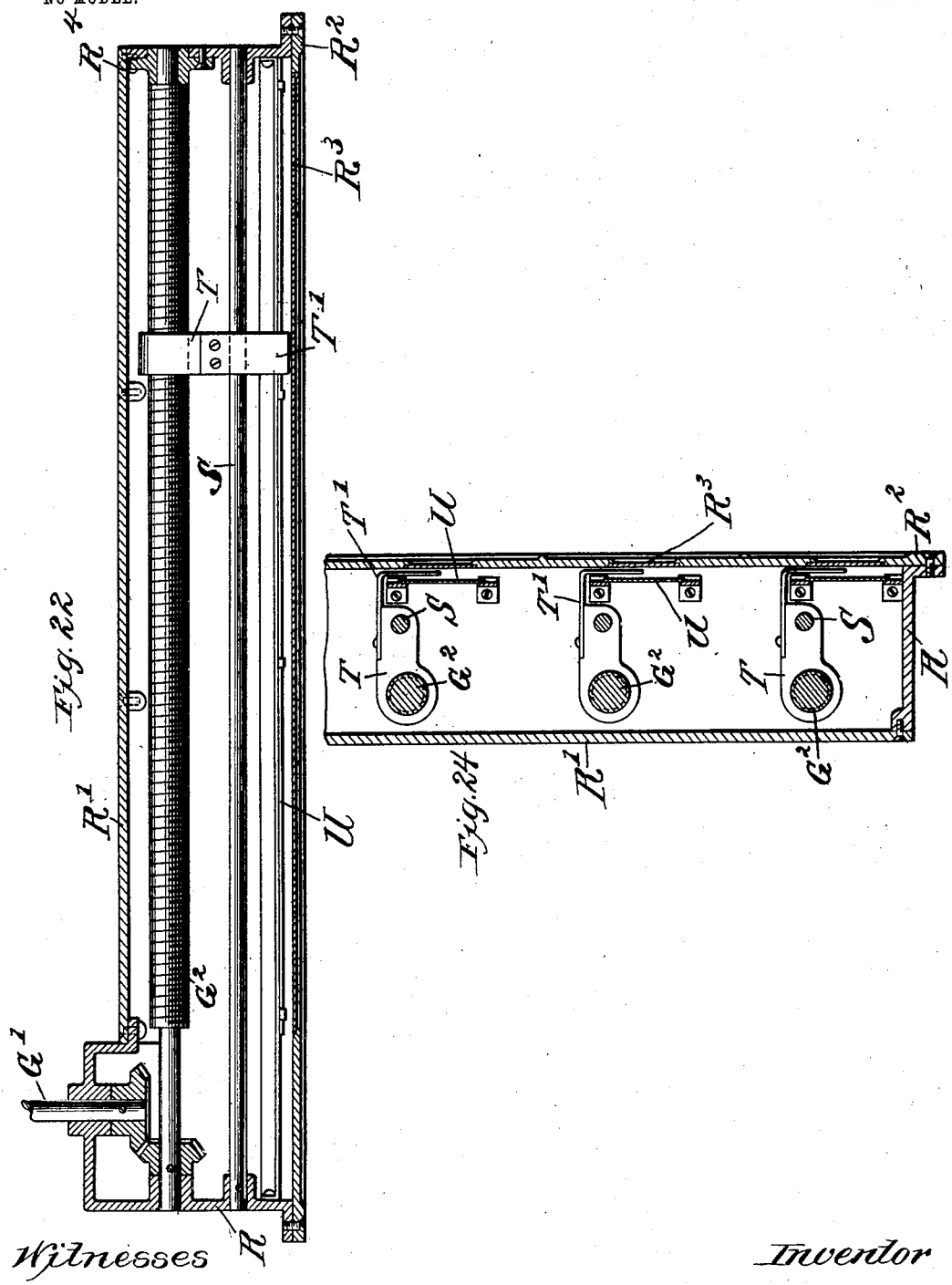
Witnesses
Inventor

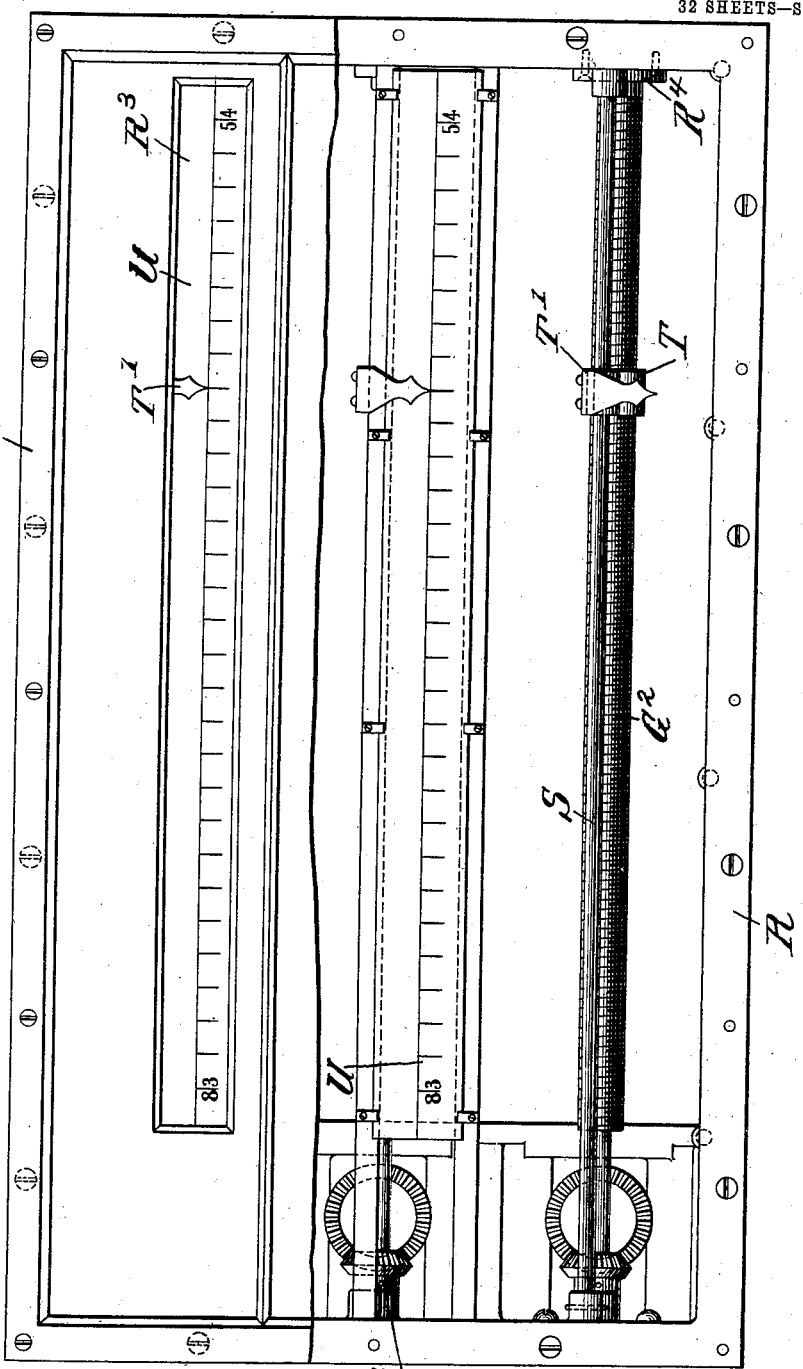

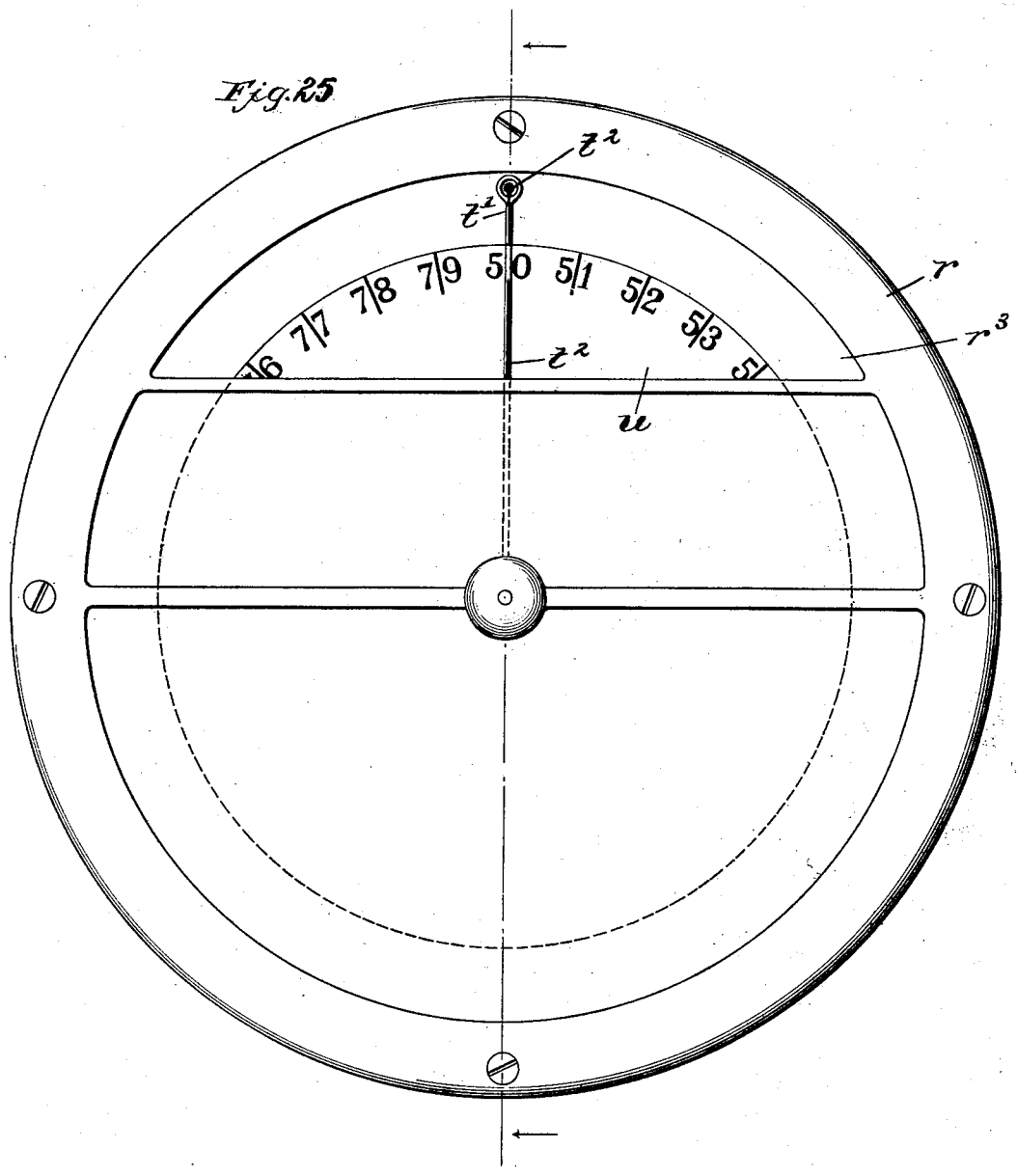

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 23.
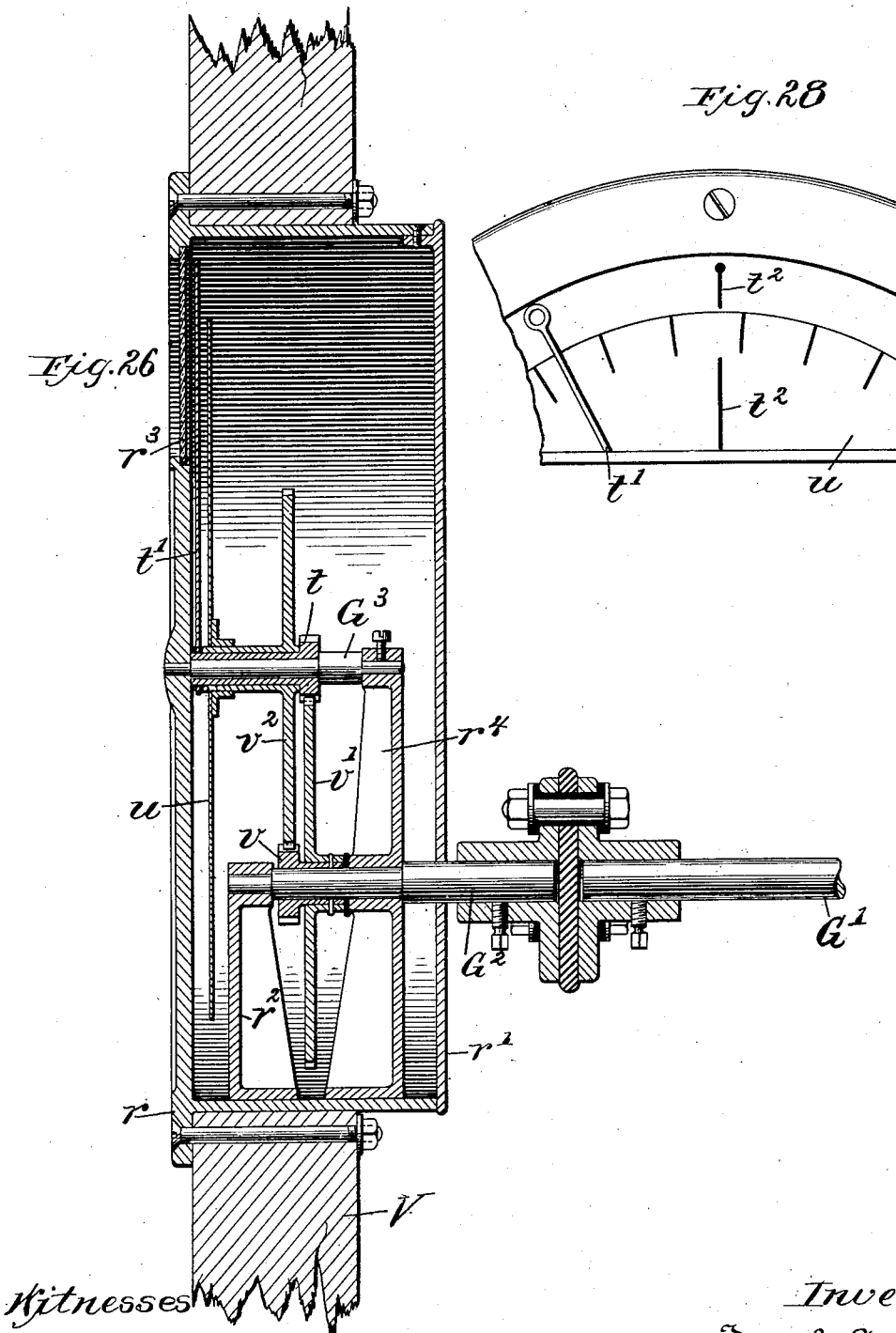

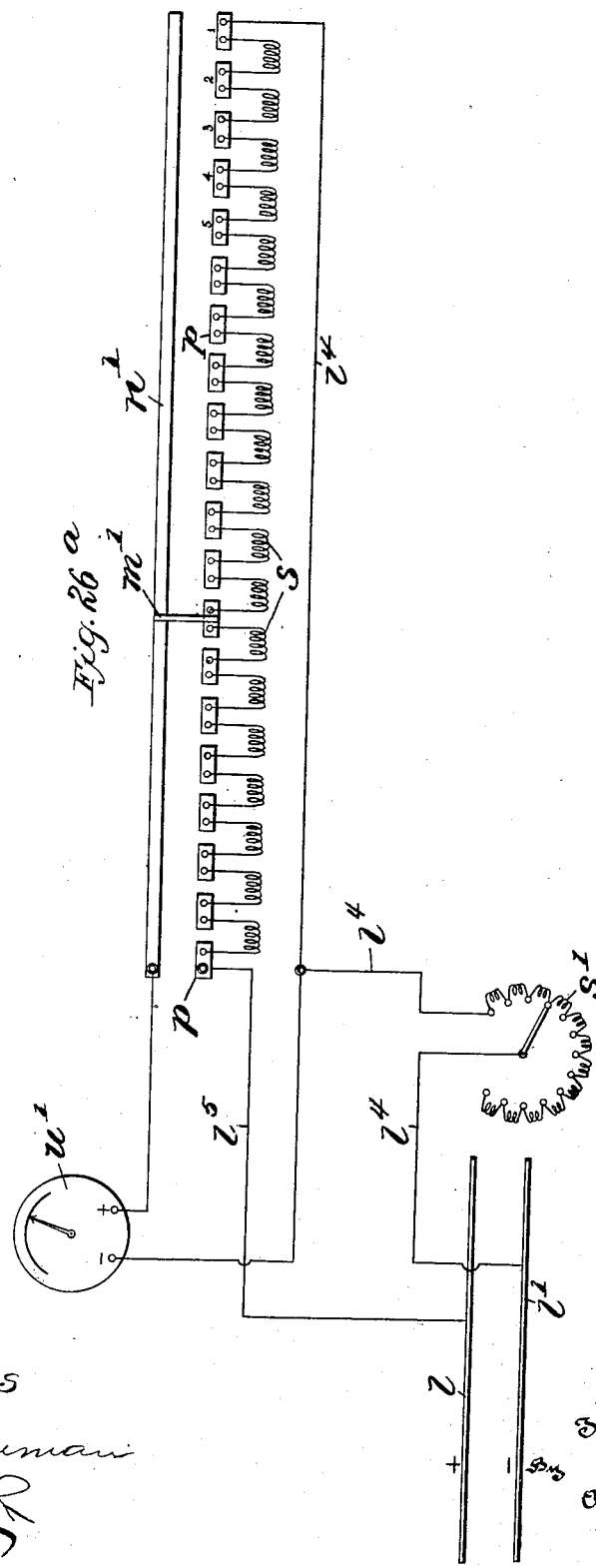

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 25.

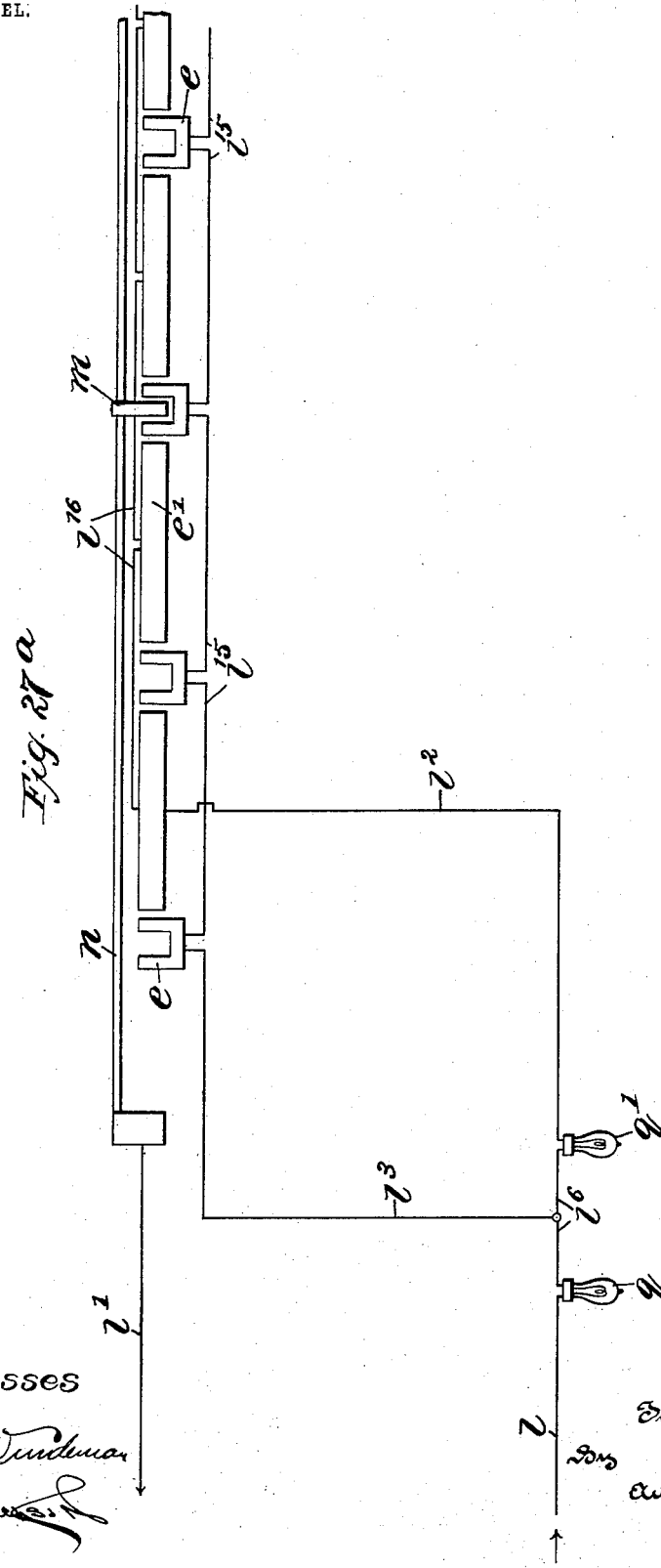

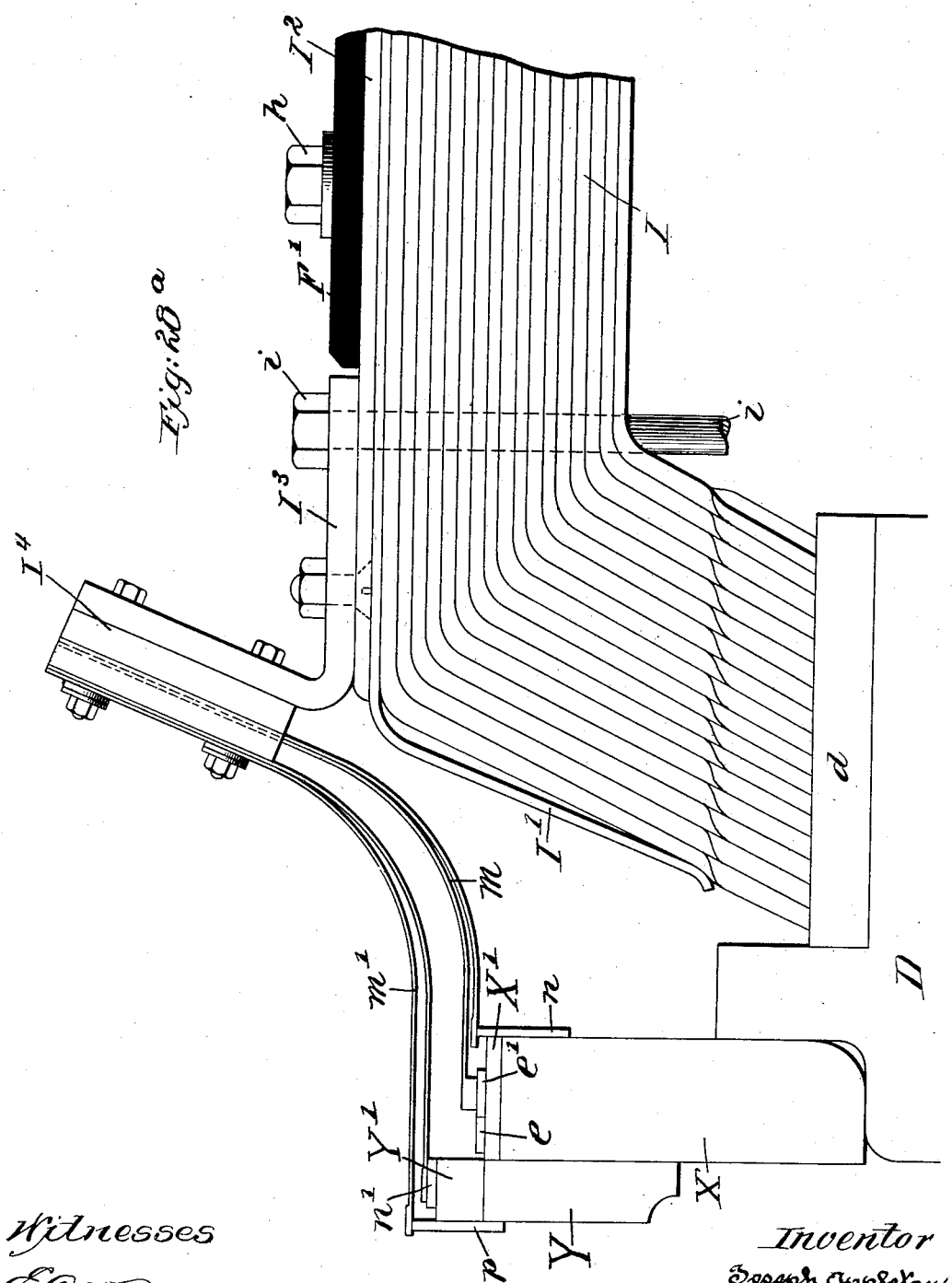

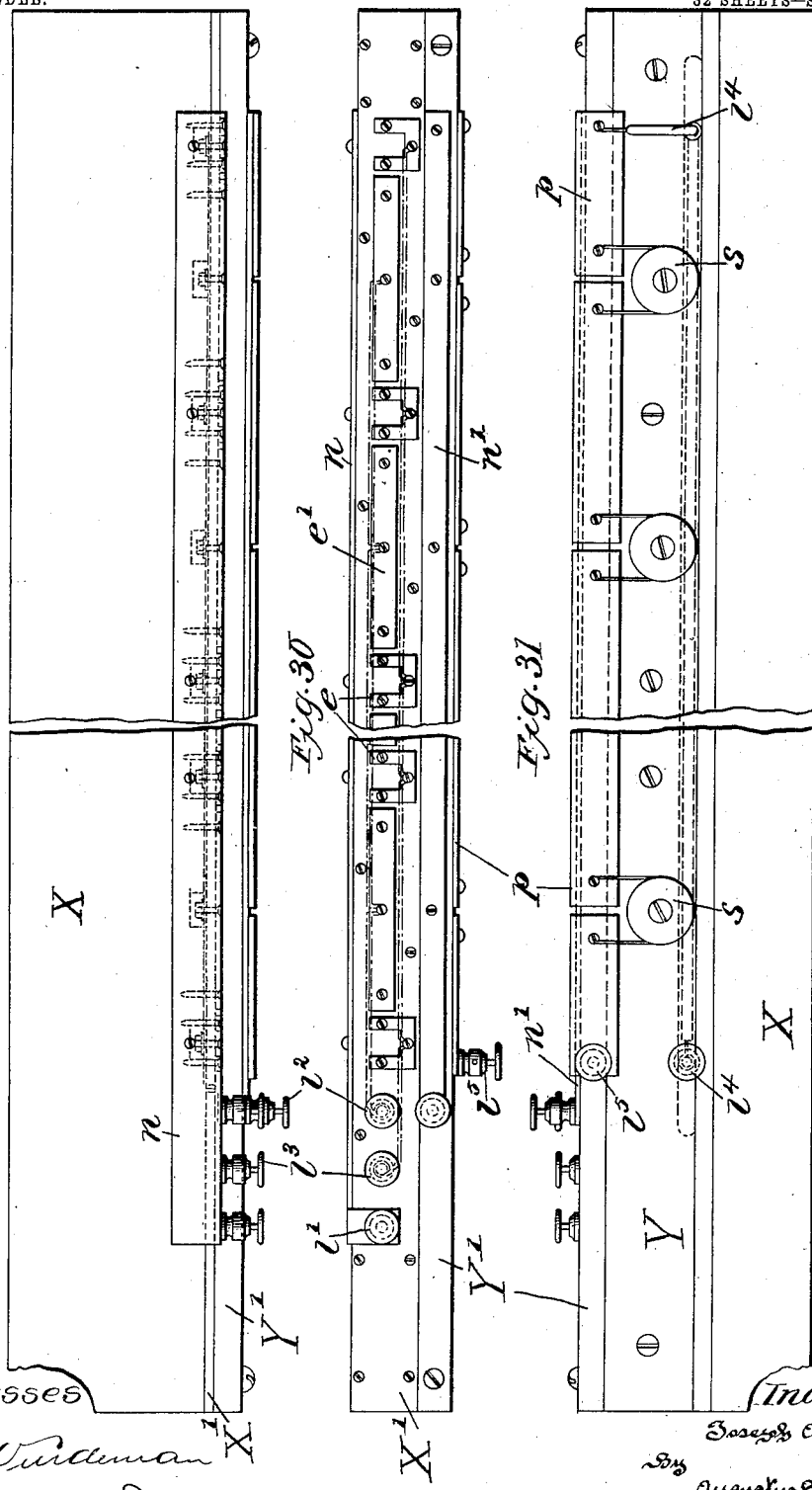

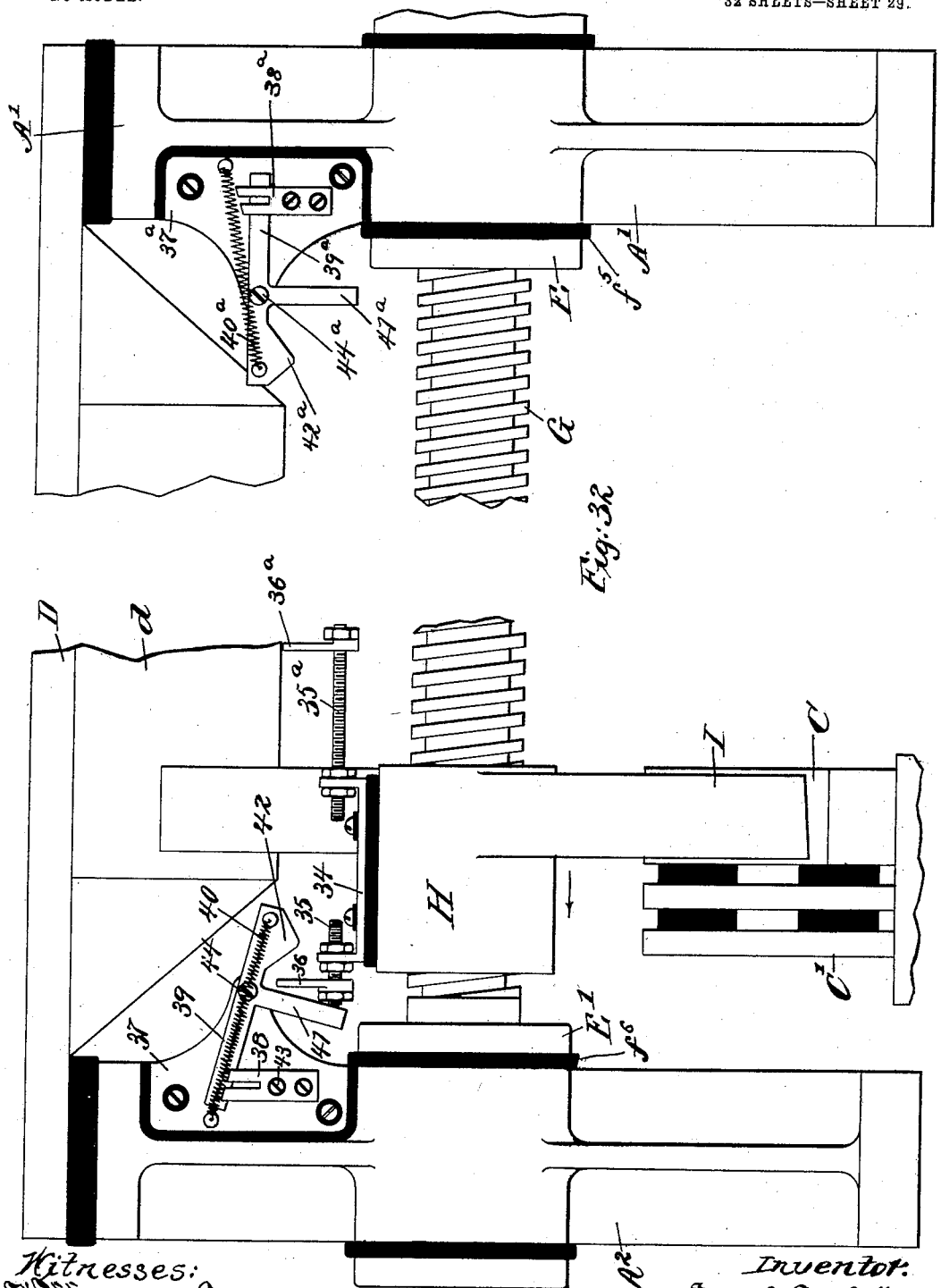

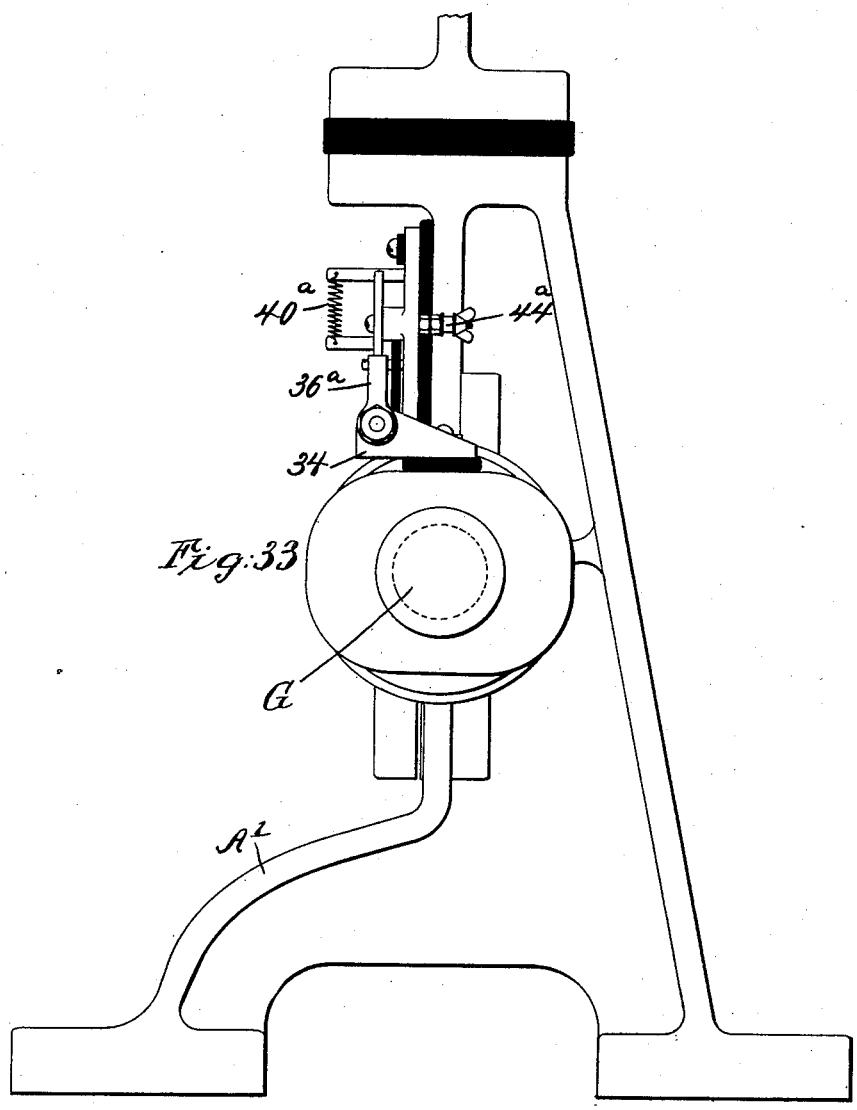

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 31.
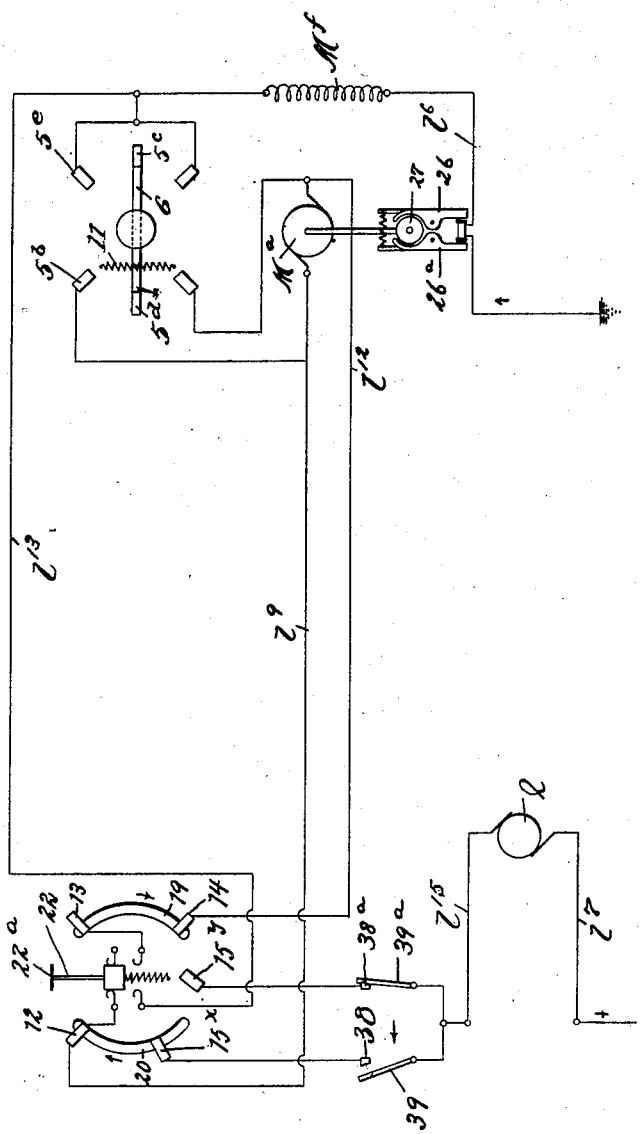

No. 734,291. PATENTED JULY 21, 1903.
J. APPLETON.
ELECTRIC BATTERY SWITCH.
APPLICATION FILED JULY 6, 1900.
NO MODEL. 32 SHEETS—SHEET 32.
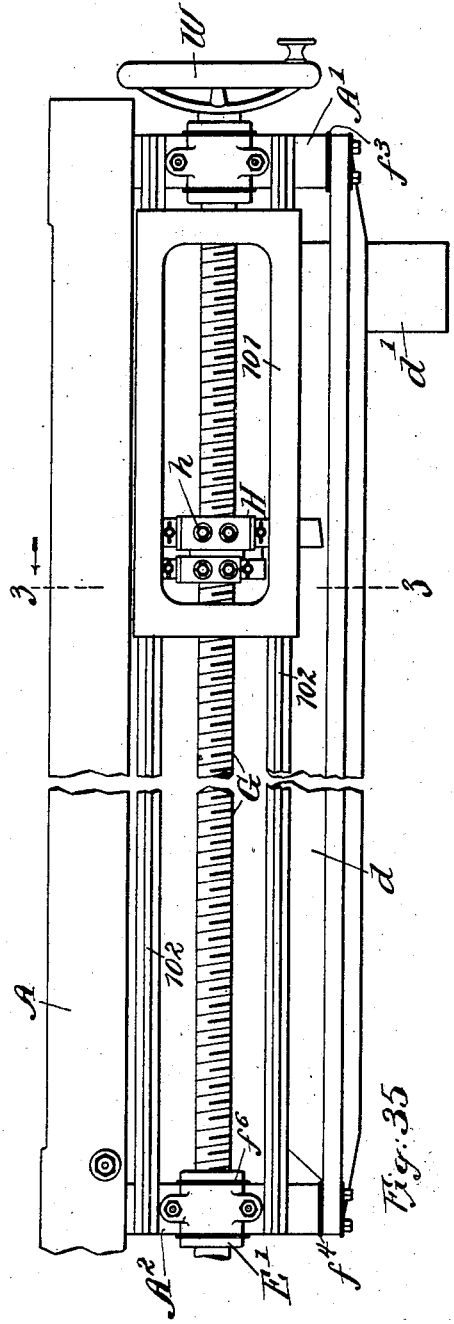
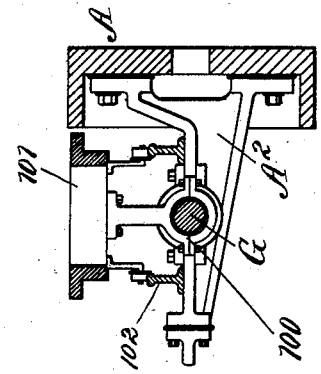
Witnesses
Inventor
Joseph Appleton
By Augustus B. Stoughton
Atty.

No. 734,291.                                              Patented July 21, 1903.

UNITED STATES PATENT OFFICE.

JOSEPH APPLETON, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

ELECTRIC-BATTERY SWITCH.

SPECIFICATION forming part of Letters Patent No. 734,291, dated July 21, 1903.

Application filed July 6, 1900. Serial No. 22,750. (No model.)

*To all whom it may concern:*

Be it known that I, JOSEPH APPLETON, a subject of Her Majesty the Queen of Great Britain, residing at the city of Philadelphia, in the county of Philadelphia and State of Pennsylvania, have invented certain new and useful Improvements in Electric-Battery Switches, of which the following is a specification.

My invention has reference to the type of battery-switches known to the art as "end-cell switches," and has for its object the provision of a new and improved end-cell switch for adding to or cutting out from a circuit any desired number of cells without interfering with the operation of the circuit, and has also for its object the provision of an end-cell switch which can be operated from a point distant from the switch; and it consists in the improvements fully described in the following specification and shown in the accompanying drawings, which form a part hereof.

Heretofore it has been customary to operate end-cell switches by hand, the operator being stationed at the switch. The most efficient place for operating the switch would be at the switchboard, as the control of the apparatus in an electric plant is usually located at this point under the direction of one man. Since, however, it carries the main line-current, an end-cell switch even for a small station is so bulky that there is little room for it at the switchboard, besides which the conductors to it from the battery would have to be so heavy and of such length and number that the wiring would be very expensive and in the way of other apparatus. At the same time the drop in potential due to this extra wiring would be excessive. For these reasons it has been customary heretofore to place end-cell switches as near as practicable to the batteries they control.

A system of mechanical transmitting-gearing could be arranged to manually operate the switch from the switchboard; but the objection to this is that even a switch of only moderate size comparatively requires considerable force to move it, and the additional friction of the transmitting-gearing would render it very difficult to manipulate. It is
also requisite that the switch in its position of rest should rest upon a contact-point and not bridge two contact-points, as this condition would cause the intervening cell of battery to become discharged, and in operating from a distant point it becomes a difficult matter to determine the exact position of the switch with reference to the contacts. Thus it has been the practice in many places to station a man at the end-cell switch to operate it according to signals received from the man in control at the switchboard.

In my invention there are means for driving a switch by a mechanical motor which is controlled from any point regardless of the distance at which this point may be located from the switch and motor.

In carrying out my invention I provide an end-cell switch with a suitable driving-motor and control the action of this motor by suitable means from any given point, such as the switchboard. I prefer to use an electric motor for this purpose and will describe my invention in connection therewith, although any other form of motor could be adapted to the same use—as, for instance, a water-motor. The following description with relation to an electric motor will enable any one skilled in the art to readily adapt any other form of motor to do the same work. This electric motor may be run from the batteries themselves or any other available and convenient supply of current. The conductors which furnish the current to the motors include a make-and-break device situated at the place at which it is desired to control the operation of the switch, and here, too, I locate a reversing-switch, whereby the current in the armature may be made to flow at will in either direction with respect to the magnetism of the field in order that the switch may be moved in either direction desired. To prevent the momentum acquired by the moving parts from carrying the switch beyond the desired point, I supply an automatic device which causes the armature to be short-circuited at the time the motor-current is broken and causes it to become as a drag by acting as a generator through the short circuit or arrange to automatically throw into action a mechanical brake acting directly to stop the moving parts.

Figure 2:
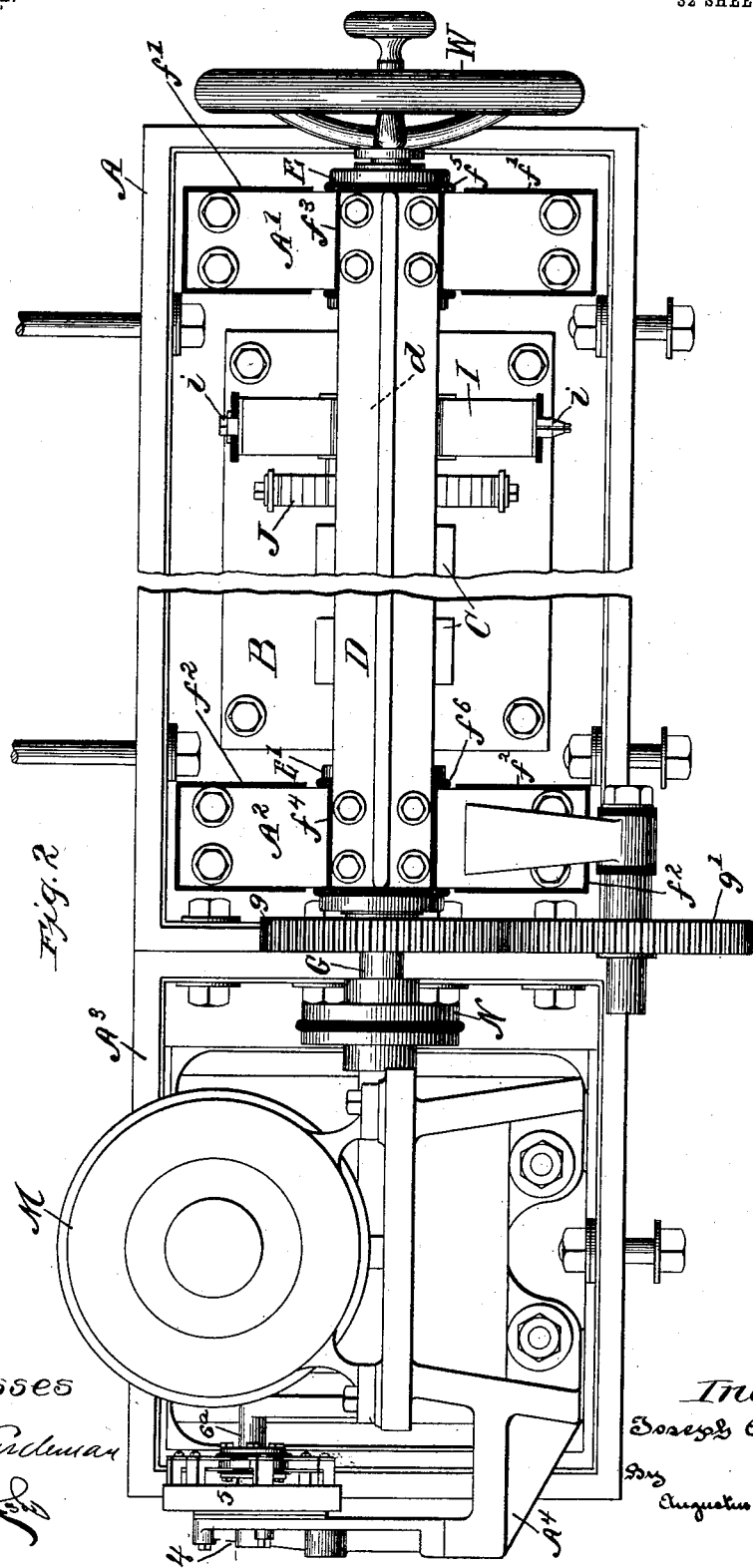
Figure 3:
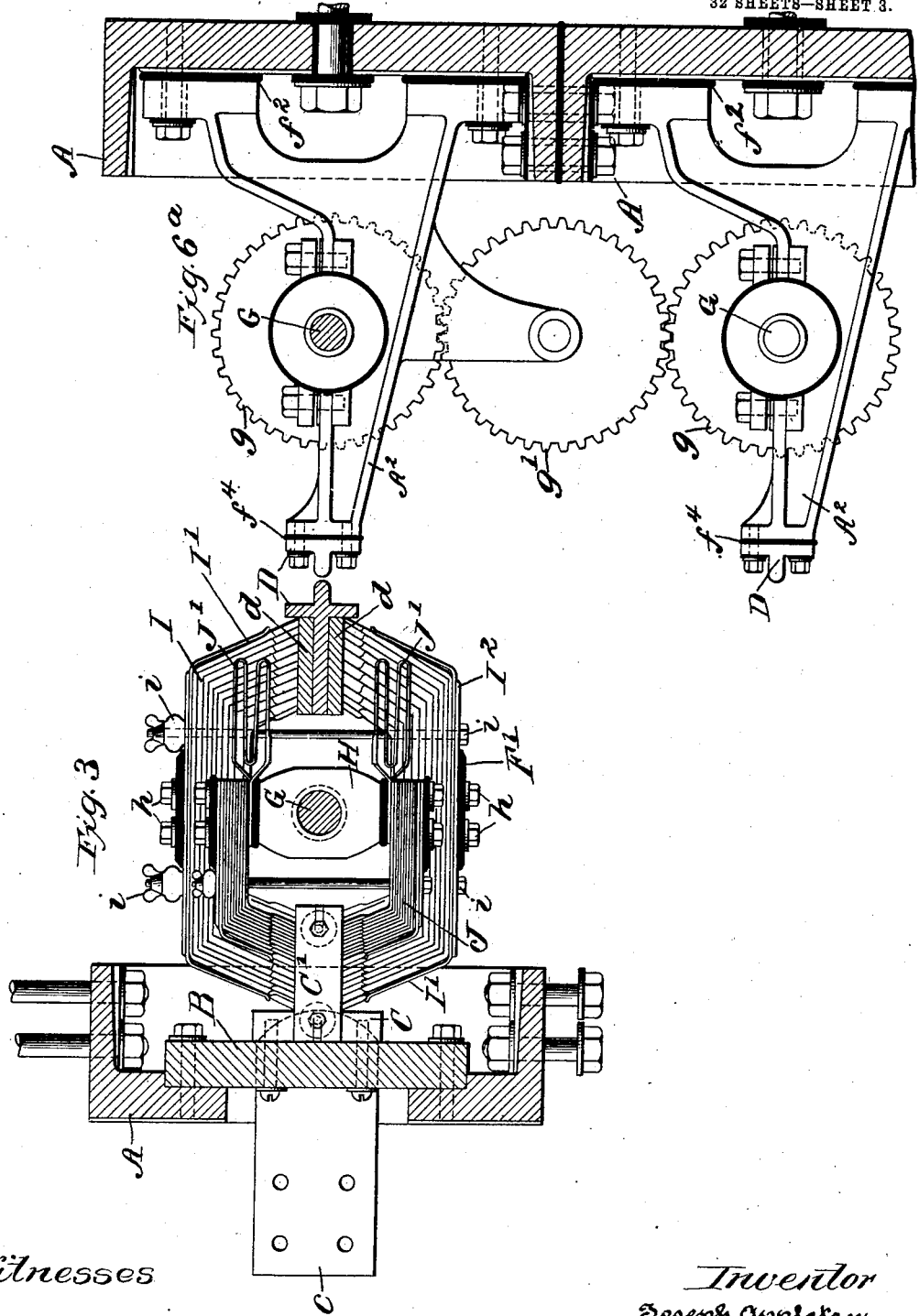
Figure 4:
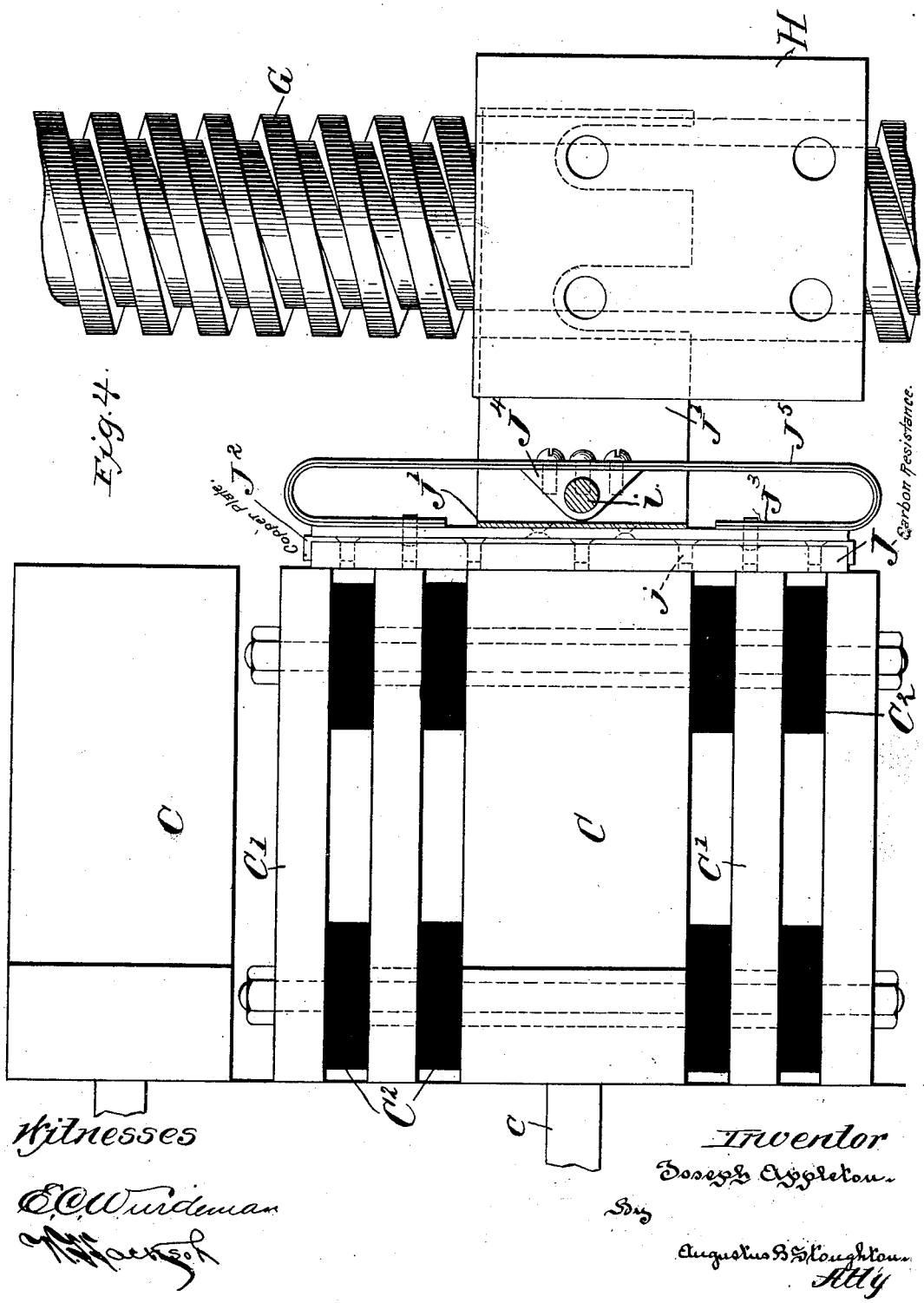
Figure 5:
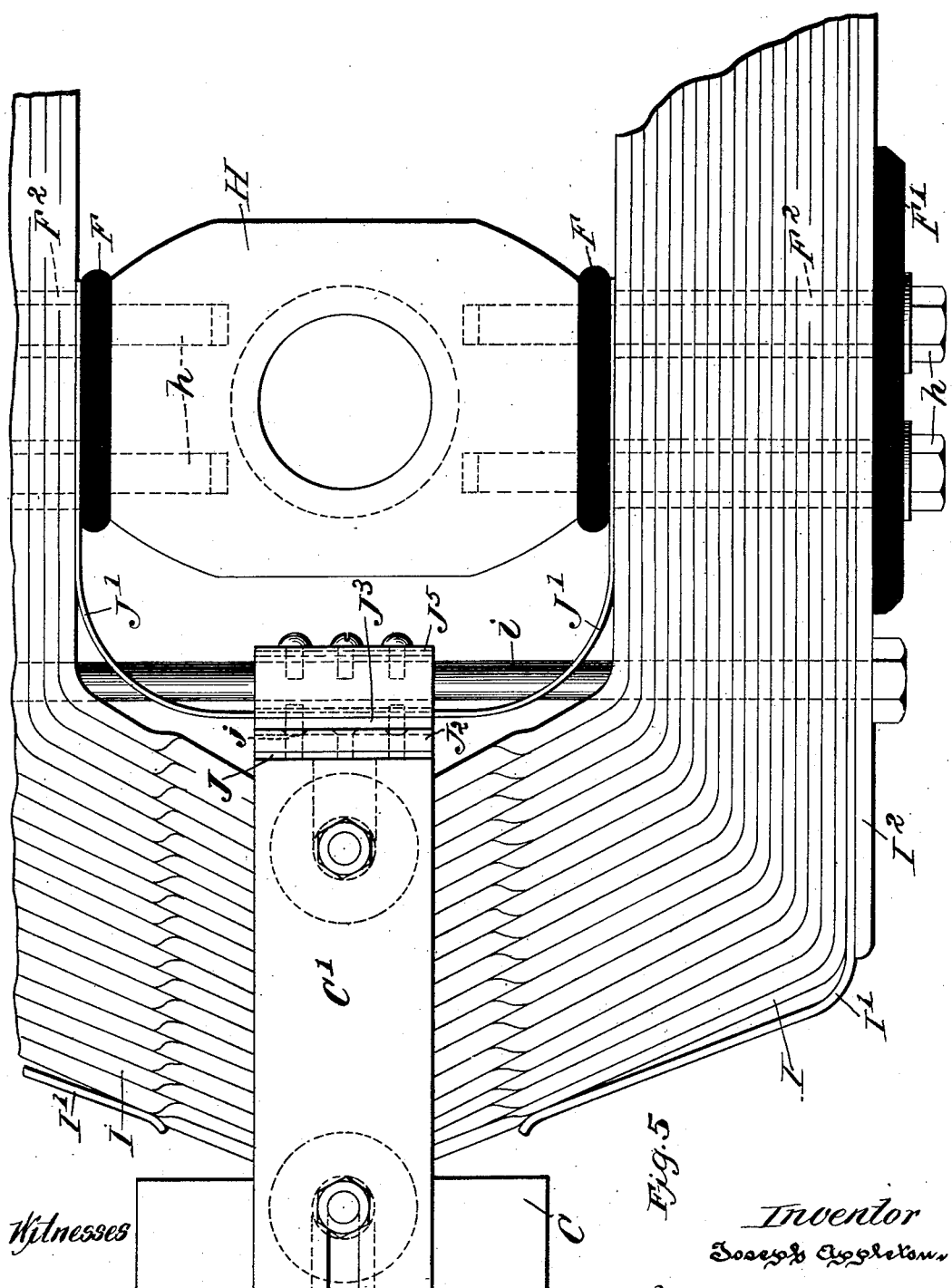
Figure 16:
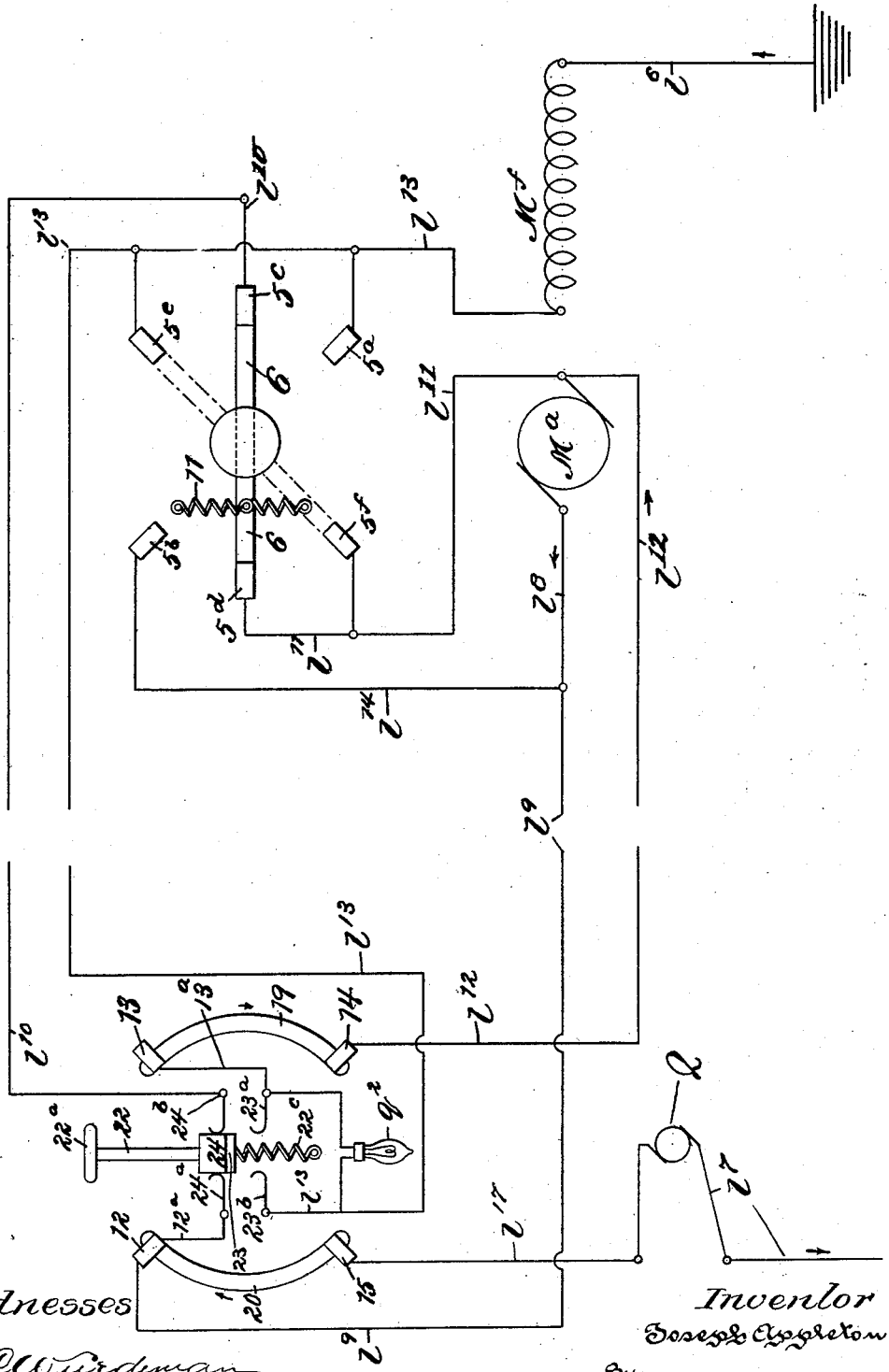
Figure 27:
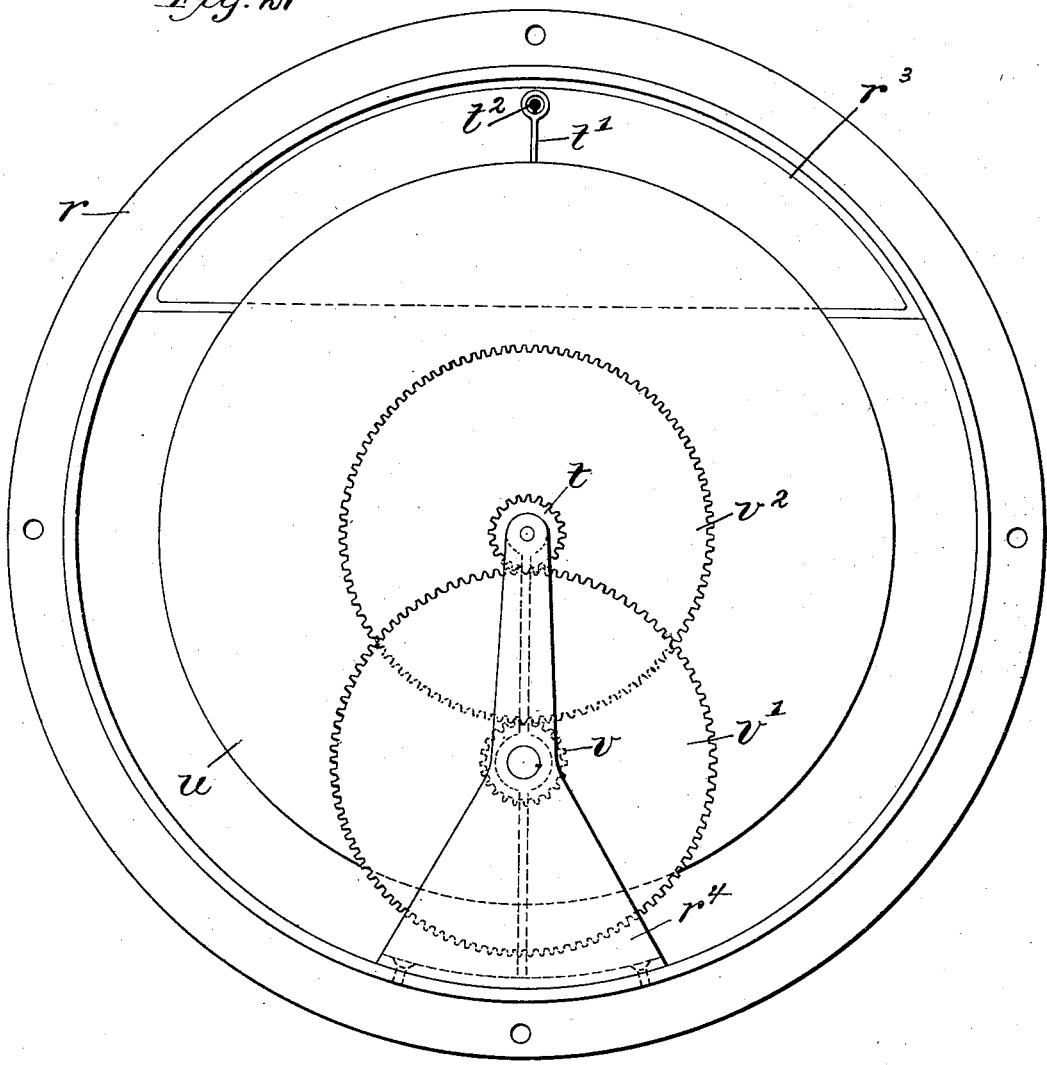

Referring to the drawings, Figure 1 is a plan view of the switch assembled and ready for operation. Fig. 2 is a side elevation of the same, drawn to a larger scale. Fig. 3 is a transverse section through the switch, taken on the line $xx$ of Fig. 1 looking in the direction of the arrows, and it shows the contact-blocks and movable contact-brushes. Fig. 4 is a plan view of two of the contact-blocks with the main contact-brush removed to show the action of an auxiliary brush for preventing sparking. Fig. 5 is an end elevation of the contact-brushes in place on the contact-blocks. Fig. 6 is an end elevation of the motor end of the switch. Fig. $6^a$, Sheet 3, is a transverse section showing a method of coupling two or more switches together in order to be run from one motor. Fig. $6^b$, Sheet 7, is a side elevation of an interlocking mechanism for driving an automatic switch to prevent the brush from stopping at any place other than upon a contact-block. Fig. $6^c$, Sheet 9, is a section of the same on the line $6^e$ $6^e$ of Fig. $6^e$. Fig. $6^d$, Sheet 9, is an end elevation of the interlocking device looking toward the main body of the switch. Fig. $6^e$, Sheet 9, is an end elevation of the automatic switch looking outward away from the main body of the end-cell switch. Fig. 7 is a horizontal section on the line of the main shaft, and it shows a modification of the interlocking switch mechanism shown in Figs. $6^b$, $6^c$, $6^d$, and $6^e$. The operation of the modification is the same as that of the construction shown in Figs. $6^b$ and $6^e$, being only a change in mechanical detail to give a more compact form. Fig. 8, Sheet 11, is a side elevation of the same modification. Fig. 9, Sheet 12, is an end view of the same looking toward the main body of the switch and has the forward mechanism removed to show the gearing and cam. Fig. 10 is a view of the cam and rocking lever, showing the action of the same. Fig. 11, Sheet 12, is a view taken on the line 11 11 of Fig. 8 looking in the direction of the arrows. Figs. 12, 13, and 14, Sheets 13 and 14, show an automatic magnetic brake acting upon the motor-shaft to lock the switch when the controlling-circuit is broken, Fig. 13 being a side elevation and Fig. 12 an end elevation, looking toward the main body of the switch. Fig. 14 is a section through the brake-clutch on line 14 14 of Fig. 13. Figs. 15 and 16 are diagrams of the electrical connection for controlling the driving of the end-cell switch, Fig. 15 showing the connections when a magnetic brake is used to lock the switch, and Fig. 16 showing a modification whereby the switch is locked by automatically short-circuiting the armature of the driving-motor when the circuit is broken. Figs. 17 to 21, inclusive, show a combination push-button switch and reversing-switch by which the starting and direction of motion of the driving-motor may be controlled. Fig. 17 is a vertical section on line $17^a$ $17^a$ of Figs. 18 and 20, showing this combination - switch complete. Fig. 18 is a plan view showing the push-button and the hand-wheel, together with the contact-blocks of the reversing-switch. Fig. 19 is a bottom plan of the switch, showing the contacts of the starting and stopping switch. Fig. 20 is a bottom plan view of a section on line $y$ $y$ of Fig. 17, showing the hand-wheel and its contact-knives and the contact-blocks. Fig. 21 is a side elevation of the bottom portion of the switch on a plane at right angles to that of Fig. 17. Figs. 22 to 31, inclusive, illustrate indicating devices for showing the position of the main contact-brush upon the contacts, thereby indicating the number of cells connected in the main circuit. Fig. 22, Sheet 20, Fig. 23, Sheet 21, and Fig. 24, Sheet 20, show a mechanical indicator for a set of three end-cell switches, and it consists of three separate indicators, each of which is connected to its governing-switch by mechanical gearing so speeded as to give the correct relative speed to the indicator-point, so that the latter points out on the scale the number of cells in circuit. Fig. 23 is a side elevation, the front portion of the lower indicator being removed to show the mechanical arrangement. Fig. 22 is a horizontal longitudinal section, and Fig. 24 is a transverse section. Figs. 25, 26, 27, and 28 illustrate a modification of the mechanical indicator in which the pointer is stationary and a dial having the numbers corresponding to the cells in circuit is caused to move one number for each contact-block space moved by the switch-brush. In addition a vernier pointer or hand is also added, which makes one complete revolution for each contact-block space and indicates when the brush is upon the center of the contact. Fig. 25 is a general front view of the device. Fig. 26 is a sectional side view, and Fig. 28, Sheet 23, is a portion of the indicator-dial, showing it and the hand in slightly-different position from that in Fig. 25. Fig. 27 is a rear elevation with the back of the device removed to show the gearing. Figs. $26^a$ and $27^a$ are diagrams showing methods of electrically indicating the position of the contact-brush without the necessity of a train of mechanical gearing, Fig. $26^a$ being a method of indicating which contact the brush is on and Fig. $27^a$ indicating when the brush is centrally located upon a contact. Figs. $28^a$, 29, 30, and 31 show these methods both together as applied to the switch. Fig. 30 is a plan view, Fig. 31 a front view, and Fig. 29 a rear view looking outward from the switch. Fig. $28^a$ is an enlarged end view showing the indicator contact-brushes and method of attaching them to the main brush. Figs. 32, 33, and 34 refer to an automatic circuit-opening device for breaking the motor-circuit when the brush has traveled to the end of the switch. Fig. 32 is a plan view showing the switch with the device attached. Fig. 33 is an end view of the same, and Fig. 34 is a diagram of the electrical connections of the motor when this device is used; and Figs. 35 and 36 are respectively a plan and an elevation illustrating means for supporting the screws of comparatively long switches.

In the drawings, A is the frame of the switch, preferably of cast-iron. Its object is to form a backbone to mount the different parts on and to form a part by which the switch may be hung or supported. It has no other office. At each end of the frame I fasten a pedestal A' and A², whose office is to carry the journal-boxes E and E', in which the main shaft G revolves. Fastened at both its ends to the two pedestals and extending the length of the switch is the bar D, whose office is to stiffen the whole structure and also to carry the contact-bars $d$, from which the main current is led off by the bus-bar $d'$.

B is the back slab of the switch, preferably of slate or marble, as these materials are good insulators and will not warp. It is securely fastened to the frame A. The contact-blocks C are fastened directly to this back slab B by means of bolts and corresponding in number to the number of end cells for which the switch is designed. These contact-blocks have lugs $c$ extending through the back slab, and between each adjacent two lugs one of the end cells of the battery $b$ (shown in diagram) is included. The shaft G is threaded, so that by revolving it the nut H, which it carries, is made to move backward or forward along the line of contact-blocks. Fastened to the nut H is the main brush I, whose function is to carry the current across between any one of the contacts C which it may be on and the contact-bars $d$. This brush is made, preferably, of laminations of spring-copper and is made in two parts, one on each side of the contact-blocks and contact-bar. Tension-bolts $i$, passing through both sides of the brush, govern the pressure of contact. The contact edges of the laminations are twisted axially, as shown in the drawings, so that the brush trails on an angle and not squarely in the line of laminations. The object of this twist is to make the wear on the contacts more uniform, because if the brush trailed in the line of the laminations ridges would be left in the contact-block between the laminations. In the construction shown in Figs. 1, 2, and 3 the nut H carries also an auxiliary brush J, whose function is to take up the spark which would otherwise occur each time when the main brush left a contact in passing across the intervening space. It is so spaced from the main brush with reference to the contact-blocks that in moving the nut down the shaft G toward the hand-wheel W the auxiliary brush makes contact with the block before the main brush has left it and the main brush makes contact with the next block before the auxiliary brush loses contact with the first-mentioned block, and vice versa when the nut moves in an opposite direction. A conductor J' is interposed between the two brushes and is of sufficient resistance to prevent the intervening cell from being short-circuited when the brushes are on different contacts. At the same time this resistance has sufficient current-carrying capacity to carry the entire line-current for the moment after the main brush has left a block and before it has made contact with the next. As will be observed in Fig. 3, the auxiliary brush does not make contact with the bars $d$.

The construction of the contact-blocks, Figs. 4 and 5, is as follows: C is the main body of the contact-block, made, preferably, of copper hardened as much as possible to resist wear, and has an extended base, by which it is attached to the slab B by means of bolts or screws, as is shown in Fig. 3. Made in one piece with the block C or securely united to it is the extending lug $c$, which passes through a slot cut in the slab B and forms the terminal to which the battery lead is attached, as has been described. The blocks C are so spaced on the slab B that the distance between them is slightly greater than the width of the brush I. Between the contacts I place the dummy-blocks or guide-pieces of the same material as the contact-blocks in order that they will wear uniformly with the latter. The ends and sides of the dummy-blocks or guide-pieces C' and the contact-blocks C form, notwithstanding the short space between them, a substantially continuous surface for the brushes to trail over, or, in other words, the guide-pieces mechanically bridge the gaps between the contacts. As one wide dummy-block would cause a short circuit between the two brushes in passing from contact to contact, two narrow dummy-blocks, insulated from each other, are placed in each space, and they may be attached to alternate contact-blocks, as shown. The spacing-washers C², of mica, vulcanized rubber, or other insulating material, serve to insulate the dummy-blocks from the contacts, and the whole are held in place to the contact-block by means of longitudinal bolts surrounded by an insulating-bushing. For convenience in replacing and adjusting the dummy-blocks the bolt-hole nearest the slab B is slotted out, Fig. 5, to the end of the dummy, and the other bolt-hole is slotted out to the other end of the contact.

Since the main and the auxiliary brushes are similar in construction, a description of the main brush will suffice for both.

I is the brush proper and, as stated above, is composed of laminated strips of copper or similar conducting material bent in a form and placed one on the other. The ends of these strips are twisted axially to an angle whose sine is at least equal to the thickness of the strip. The strips are held together and also to the nut H by bolts $h$, which are insulated from the brush by the insulating-bushings F² and the washers F and F', of insulating material. The brush, although firmly attached to the nut H, is insulated from it by the piece F, of mica or other insulating material.

I' is a reinforcing-spring pressing upon the brush near the contact ends of the laminations.

I² is a metal stiffening-plate.

A modified form of an auxiliary brush is shown in Figs. 4 and 5. In this construction the resistance-coil J' in Fig. 3 is supplanted by a direct-connection strip of copper J' in Figs. 4 and 5, the resistance being in the brush itself, J, which is made of carbon and is of such a length that it spans the space between two contact-blocks with enough lap on each to give ample contact to carry the current during the short time in which it is passing from one to the other. At the same time it is not long enough to bridge three contact-points. In the construction shown this brush is placed so as to trail along the ends of the contact-blocks and is placed centrally with relation to the main brush. Obviously the center part of this brush could be cut away, if desired, thus leaving the ends, which are the effective parts. Fig. 4 shows the same nut H as used with the construction shown in Figs. 1, 2, and 3; but only one end of this nut is used with the construction shown in Fig. 4, because the auxiliary brush is replaced by the carbon piece J. It may be remarked that the connecting-strip J' is forked at its ends, as shown by dotted lines in Fig. 4, so that when the bolts h have been loosened and the bolt i removed the auxiliary brush may be readily detached from the main brush. In the position shown in this figure the main brush is squarely on the center of the contact-block. The carbon block J in itself would be of resistance higher than necessary, and to aid its conductivity it is reinforced by the copper plate J², attached to it by the screws j, which pass through the plate J² and are threaded into the carbon. These screws do not extend all the way through the carbon and perform the double function of supporting the carbon brush and of forming a path of better electrical conductivity from the contact-block to the plate J². Carbon molded around a metallic gauze can be procured on the market and is especially well adapted to this purpose. The whole is stiffened by the plate J³. The carbon brush is attached to the main brush by means of the flexible spring J⁵, which is fastened to the carbon brush by screws, which pass through plates J² and J³ and are threaded into the spring J⁵, thus holding also the plate J³. Holes drilled through the carbon allow the screws to be put in place. J⁴ is a rider placed upon the bolt i of the main brush, and to it is fastened the spring J⁵. Electrical connection between brush J and the main brush is made by means of the copper strip J', Fig. 5, the ends of which are gripped under the main brush. The central portion is riveted to the plate J³.

To avoid any possibility of parts becoming short-circuited or of any portion becoming "alive," insulation is put between the parts connected. Thus the insulating-blocks f' and f² are placed between the pedestals and frame of the switch and the connecting-bolts are surrounded by insulated bushings. The contact-bars d are fastened directly to the longitudinal bar D without any insulation being interposed, so that the insulating-blocks f³ and f⁴, Fig. 1, are interposed between the bar D and the pedestals and the uniting-bolts are bushed with insulating material. The journal-boxes E and E' are supplied with the insulating-bushings f⁵, Fig. 1, and f⁶, and the shaft G is supplied with an insulated coupling N, Figs. 1 and 2, between it and the driving-motor. Thus there is double insulation for all the parts. For example, if the insulation F on the nut H should be defective the current can get no farther than shaft G, or if insulation f³ or f⁴ should be defective the current can get no farther than the pedestals.

P is a clutch which when locked enables the switch to be operated by the motor M and which when opened enables it to be operated by the hand-wheel W, Fig. 1.

Referring to Fig. 1, the diagrammatic portion of the drawings shows the electrical connections of the battery and the function of the switch in cutting in or out the cells.

b is the battery, consisting of any number of cells arranged in series, the end cells of which (in number one less than the number of contact-blocks of the switch) are connected between extensions of the contact-lugs C, so that the positive pole of one cell and the negative pole of the next cell are connected to the same contact-block. The end-cell switch may of course be connected at the cells at either the positive end of the series of batteries or the negative end. Assuming that the switch is operating the end cells at the positive end of the series and that the battery is discharging into the line, then the current will be taken from the contact-block by the main brush (assuming its location to be as shown in Fig. 1) and carried by it to the contact-bars d and thence by d' to the lines l²⁰ l²¹ through the load-circuit L and back to the batteries by the line l'. The generator Q is shown as connected in multiple with the battery. Assume the shaft G to be revolved, so that the main brush I would just come up to the line o o. The auxiliary brush J would then be on the contact-block just about to be left by the main brush, and in advancing slightly farther the main brush would leave the contact-block. The current would then pass from the contact to the auxiliary brush through the resistance J' to brush I. As the brushes advance farther the main brush comes in contact with the next contact-block. Each brush is then in connection with a different pole of one cell which discharges itself momentarily through the resistance until the main brush moves on to line $ww$, when the auxiliary brush breaks its connection with the contact and the condition again becomes as shown in the drawings, except that one cell has been cut out. When two or more switches are used together, it is often desirable in practice to operate them synchronously. Fig. 6ª shows a method of coupling two switches to work together in this manner. As shown, both frames A A are bolted together, but are insulated from one another. The shaft G of each is supplied with a spur-wheel $g$, both of the same size, and the idler-wheel $g'$ transmits the motion of one to the other. The idler $g'$ may be arranged to slide on its shaft so that it can be thrown out of mesh and the switches worked independently.

Figs. 22, 23, and 24 show an indicator for indicating the position of the brush on the contact-blocks. As shown, the device is three indicators combined in one frame, and each indicator is controlled independently of the others by the switch, the position of which it indicates. The shaft $G^2$ may be a direct extension of the shaft G on the switch or arranged to be moved by it by a train of gears or in any way equivalent to the same. In the construction shown the shaft $G'$ is an extension of the main shaft G and is geared to $G^2$, the latter carrying a screw-thread upon which the nut T works back and forth. The gearing between the shafts $G'$ and $G^2$ is so related to the thread on $G^2$ that for each contact-space moved by the main brush on the switch the nut T moves a distance longitudinally corresponding to one space on the scale U. $T'$ is a finger attached to the nut T and points on the scale U the position of the brush with reference to the contacts. R is the frame upon which the various parts are mounted and also forms the inclosing sides. $R'$ is the inclosing back plate, and $R^2$ the front plate. $R^3$ is a transparent plate set into the front, and back of it is placed the indicating-scale U. S is a guide upon which the nut T slides, and $R^4$ a bearing in which shaft $G^2$ turns.

Figs. 25, 26, 27, and 28 show a modified form of indicator having a double function of indicating when the brush is exactly on the center of a contact and as well as which contact the brush is on. In this form of construction a dial $u$, marked at equal spaces, is made to rotate near the circumference one division for each contact-space moved by the main brush on the switch, while a pointer $t'$ is arranged to make one complete revolution in the same space of time. As shown, $r$ is a cylindrical frame forming the inclosing sides and front of the frame and is attached directly to the switchboard or other support V. $n'$ forms the inclosing back. The shaft $G'$ is either an extension of the main switch-shaft G or a geared equivalent. $G^2$ is an extension of $G'$, but insulated from it by an insulating-coupling. $G^3$ is a fixed pin upon which both the indicator-dial $u$ and the pointer $t'$ turn coaxially. Into the front part of the frame $r$ is placed the transparent plate $r^3$, upon which is marked the index $t^2$, which shows the position of dial $u$ and the pointer $t'$. $t$ is a pinion working on the pin $G^3$, and to it is attached the pointer $t'$. Sleeved upon this is the wheel $v^2$, which carries the dial $u$. The pin $G^3$ is supported by the frame at its forward end and is supported at its rear end by the pedestal $r^4$ and is locked from turning by a set-screw. The shaft $G^2$ passes from the rear of the indicator and rests at its forward end in a pedestal $r^2$, in which it turns, and has another bearing in the pedestal $r^4$, through which it passes. The pinion $v$ and wheel $v'$ are carried by the shaft $G^2$ and turn with it, $v'$ meshing into pinion $t$, and $v$ meshing into wheel $v^2$. The wheel $v'$ and pinion $t$ are proportioned so that when the main brush of the switch is moved exactly one space by the rotation of the shaft G the pinion $t$, carrying the pointer $t'$, makes exactly one complete revolution. The pointer $t'$ is fixed upon the pinion $t$ so that when the brush is exactly central upon a contact the pointer $t'$ coincides with the index $t^2$. The pinion $v$ and wheel $v^2$ are proportioned with relation to the wheel $v'$ and pinion $t$ so that the wheel $v^2$ moves through an angle corresponding to one space marked upon the dial $u$, while the pinion $t$ makes a complete revolution. The dial $u$ is fixed upon the wheel $v^2$ in relation to the pointer $t'$ and the index $t^2$ so that the latter indicates upon it which contact the brush is on.

Fig. 26ª is a diagram showing means for indicating on an electric meter the position of the main brush on the switch. The contact-bar $n'$ runs the entire length of the switch, and the small contact-blocks $p$ are equal in number to the main contact-blocks of the switch and being set opposite the same correspond therewith in spacing. Resistance-coils $s$ are interposed between these contact-blocks $p$, thereby connecting them in series, and this series is connected across two mains $l$ and $l'$ by the leads $l^5$ and $l^4$, a governable resistance or rheostat $s'$ being interposed in the lead $l^4$, by which the amount of current may be maintained constant. $m'$ is an auxiliary brush traveling with the main brush of the switch and rests upon a contact $p$ when the main brush rests upon its corresponding main contact. The brush $m'$ also makes contact with the bar $n'$ at all times. A potential-indicator $u'$ is connected between the bar $n'$ and a point on the lead $l^4$ between the contact-blocks and the adjustable resistance $s'$ and indicates the drop in electromotive force between the lead $l^4$ and the brush $m'$. Since the number of coils included between the brush $m'$ and the lead $l'$ change as the brush $m'$ changes its position, a corresponding change in potential occurs, since the current flowing through the resistance-coils $s$ is constant. Therefore the scale of the indicator $u'$ may be marked to show which contact the brush $m'$ is in contact with, and thus indicate the position of the main brush upon the switch. The resistance $s'$ is merely as an adjustment to compensate for variations in potential between the leads $l\ l'$ and possible changes in the resistance of the coils $s$, so that a constant current may be maintained.

Since the electrical indicator just described indicates only which contact the main brush is upon, I have devised another indicator, which can be worked jointly with the foregoing or independently, to show when the main brush is located upon the center of a contact. This is shown in diagram in Fig. 27$^a$, in which $q$ and $q'$ are two incandescent lamps. The lamp $q$ indicates, respectively by its brightness, dimness, or extinguishment, whether the main brush is on the edge of a contact-block, is between two contact-blocks, or is in the center of a contact-block. The lamp $q'$ is used merely as a dead resistance, whose duty is to dim the indicating-lamp $q$ at certain positions of the contact-brush. Any other equivalent resistance would serve the purpose. Current to operate the device is obtained from the mains $l$ and $l'$ or from any suitable and convenient source. At the switch is the contact-bar $n$, which runs the entire length of the switch parallel to the main shaft G. Opposite the center of each contact-block is placed an auxiliary U-shaped contact-block $e$, and between these auxiliary contact-blocks are placed other auxiliary contact-blocks $e'$ of such length as to not quite bridge the space between the contacts $e$. An auxiliary brush $m$ is attached to the main brush of the switch and travels with it. It is of such width as to bridge the spaces between the contacts $e$ and $e'$, but narrow enough to go into the space between the arms of the U-shaped contacts $e$ without making contact with either arm. The brush $m$ is so placed with reference to the main brush that when the main brush is on the center of a contact the auxiliary brush $m$ is in the center of a U-shaped contact $e$. The brush $m$ is at all times in contact with the contact-bar $n$, and its function is to connect this contact-bar $n$ with a contact $e$ or a contact $e'$, according to the position of the main brush with relation to its contact-blocks. The blocks $e$ are all connected together by means of the spanners $l^{15}$, and the blocks $e'$ are likewise connected together by the spanners $l^{16}$.

The two lamps $q$ and $q'$ are connected in series with each other by the lead $l^6$ and in series with the contacts $e'$ by the lead $l^2$. The lead $l^3$ connects the contacts $e$ to a point on the lead $l^6$ between the two lamps.

Assuming that the brush $m$ is in the position shown, no current is flowing and the lamp $q$ is out, indicating that the main brush is upon the center of a contact. However, when the brush $m$ is moved in either direction it immediately comes in contact with the block $e$, the current passing through the lamp $q$ and by the leads $l^6$, $l^3$, and $l^{15}$ to the contact $e$ and thence by the brush $m$ to the contact-bar $n$, which is always connected to the main $l'$. The lamp $q$ is thus connected directly across the mains and burns brightly, indicating that the main brush is upon a contact, but not on the center. The lamp $q$ remains bright until the brush $m$ has left the contact $e$, when the current has to flow through both the lamps and by the leads $l^2$ and $l^{16}$ to contact $e'$ and thence across the brush $m$ to the contact-bar $n$. The lamp $q$ is thus made quite dim, owing to the resistance of the lamp $q'$ having been interposed in series with it, and indicates that the main brush is far from the center of a contact-block. As the brush $m$ again comes in contact with a block $e$ the lamp $q'$ is short-circuited, and the brightening of the lamp $q$ is a warning that the main brush is again approaching the center of a contact-block.

The two indicators shown in diagram in Figs. 26$^a$ and 27$^a$ are combined and shown in position on the switch in Figs. 28$^a$, 29, 30, and 31. The contacts are made, preferably, of copper and are mounted upon an insulating-base. I prefer to make the insulating-base of wood and fasten it to the switch on the longitudinal bar D. I prefer to make the wood base in four parts X, X', Y, and Y' and conceal the wiring between the parts in assembling. The auxiliary brushes $m$ and $m'$, as shown in Fig. 28$^a$, are supported in one block I$^4$, of wood or other insulating material, insulated separately of each other and from other supporting parts, and for better flexibility each brush is made in two parts carried on separate springs, which are joined and electrically connected together at the block 14. The brushes are held to the block and the whole bound to a supporting-angle I$^3$ by means of bolts insulated from the brushes. The angle I$^3$ is bolted directly to the main brush I.

In connection with the remaining figures I shall describe the end-cell switch as driven by an electric motor. The motor M is attached to the main frame of the switch, Fig. 6. The motor is also shown in Figs. 1 and 2. In the construction shown the main frame is extended by bolting to it the extension-frame A$^3$, to which is attached a bracket A$^4$, which supports the motor. The method of supporting the motor is not material to my invention, as the switch could be placed horizontally, vertically, or on one side and different forms of support adopted for different conditions in practice. This motor M is geared to the main shaft G, preferably by a worm 3 on the motor-shaft $a$ and a worm-wheel 2 on the main shaft G. A pedestal-bearing 1, attached to the bracket A$^4$, supports the end of the main shaft G, and an insulated coupling N is interposed in this shaft to prevent "grounds." The armature-shaft $a$ has an insulated coupling O for a similar purpose located between the motor and the worm. The clutch P on the shaft G is added, so that the motor mechanism may be detached to enable the switch to be operated by hand if desired.

The pedestal 1 is extended to form a bearing for the armature-shaft $a$. The worm at one end of the bearing and a collar on the shaft at the other end combine to take up the thrust of the worm in both directions. The pedestal 1 also forms a support for a mechanism operating an automatic switch controlling the motor, and I will now describe this mechanism.

Referring to Figs. $6^b$, $6^c$, $6^d$, and $6^e$, 5 is the base of the automatic switch and is composed of slate or other suitable material. It is bolted to the pedestal 4, a sheet of leather 51 being interposed to give it a firm seat and to adjust inequalities of surface. The object of the slate base 5 is to support the contacts $5^a$, $5^b$, $5^c$, $5^d$, $5^e$, and $5^f$, which are bolted to it, and with them it forms the fixed part of the switch. The moving part of the switch consists of a disk 6, having two projecting knives diametrically opposite and projecting radially to engage with the contacts and connect them together in pairs. The disk 6 is fixed to a cranked sleeve $6^a$, but is insulated from it by an insulating-bushing $6^b$. The bolts $6^c$, which fasten the disk to the flange on the sleeve $6^a$, have insulated bushings, so that the disk 6 is completely insulated. The sleeve works on the fixed pin 7, which is supported at each end in the pedestals 1 and 4 and is concentric with the switch-block 5, so that when the crank $6^d$, which is in one piece with the sleeve $6^a$, swings either way on the pin 7 it carries with it the disk 6, with its projecting knives, and operates the switch. The pin 7 is pinned to the pedestal 4 by the pin $7^a$, fixing it against turning and moving axially. The sleeve $6^a$ is prevented from moving axially by the pedestal 4 on its outer and a shoulder on the pin 7 at its inner end. The crank $6^d$ is operated by the main shaft G in the following manner:

The end of the main shaft G is supplied with a pinion 8, which revolves with it and which engages with the internal gear $9^a$, which is fastened securely to the cam 9. The cam 9 is free to turn upon a fixed pin 10, which is supported at each end by the pedestals 1 and 4 and which is locked to pedestal 4 by a set-screw. End motion of the cam is prevented by the pedestal 1 at its inner face and a collar $10^a$, secured to the pin 10, at the outer face of the cam. The crank $6^d$ has at its swinging end a roller $6^e$, which rolls upon the circumference of the cam 9, and the parts $6^d$ and $6^e$ constitute a follower. The length of the crank $6^d$ and the diameter of the cam 9 are proportioned with relation to each other so that when the roller $6^e$ rests upon the high part of the circumference of the cam 9 the crank $6^d$ is in an angular position out of line with the centers of the pins 7 and 10, and the switch-knives 6 bridge either the contacts $5^a$ and $5^b$ or the contacts $5^e$ and $5^f$, according to which side the crank is inclined. A recess is formed in the circumference of the cam 9 of sufficient depth to allow the crank $6^d$ to swing out into line with the center of the cam, and a tension-spring 11 between the crank $6^d$ and the pin 10 causes the crank to seek this position. Thus once in each revolution of the cam the crank $6^d$ is pulled by the tension-spring 11 into line with the center of the pin 10, and in this position the switch-knives 6 bridge the central contacts $5^c$ and $5^d$. The gears 8 and $9^a$ are so proportioned with relation to the pitch of the screw-thread on the main shaft G that the cam 9 makes one revolution for each contact-space traveled by the nut H on the screw of the main shaft G. Thus if the pitch of the thread on G were such that exactly four revolutions were required to make the nut H travel along the shaft G a distance exactly equal to the distance from center to center of the main contact-blocks C then the pitch diameter of the gear $9^a$ should be exactly four times the pitch diameter of the pinion 8.

Fig. $6^d$ shows the crank down in the recess in the circumference of the cam 9, and Fig. $6^e$ shows the corresponding position of the automatic switch. The cam is so placed that when in the position shown in these two figures the main brush I of the main switch is directly in the center of a contact.

I will now describe the operation of the motor and its controlling-switches.

Referring to the diagram of the electrical connections, Fig. 16, I happen to have selected for illustration a series motor—that is, one in which the armature is in series with the field. The parts of the automatic switch shown on the diagram have the same symbols as used for the same parts in the preceding figures—i. e., Figs. $6^b$, $6^c$, $6^d$, and $6^e$—and the symbols referring to the parts of the hand-switch are likewise the same as those used in the detailed drawings of the latter, Figs. 17, 18, 19, 20, and 21, in which $22^a$ is a push-button which carries a rod 22 and $22^b$, to which are fastened contact-knives 23 and 24. A compression-spring $22^c$ keeps the button normally in its uppermost position, with the knife 24 bridging the fixed contacts $24^a$ and $24^b$ and the knife 23 free from contact with the contacts $23^a$ and $23^b$. When the button $22^a$ is pushed down, the knife 24 loses connection with the contacts $24^a$ and $24^b$ and the knife 23 bridges the contacts $23^a$ and $23^b$. 12, 13, 14, and 15 are the fixed contact-blocks of the hand reversing-switch and are connected together in pairs by the movable bars 19 and 20, which are turned at will to connect either the contacts 12 with 15 and 13 with 14 or 12 with 13 and 14 with 15, thereby controlling the direction of the flow of current through the armature $M^a$ of the motor. The motor-field $M^f$ is so connected that the current flows through it in one direction only, and its polarity is never changed. Q is any convenient source of electrical supply to operate the motor. It is interposed between two conductors $l^7$ and $l^{17}$. Assuming that the current flows from the source of supply Q out into the conductor $l^7$, (the polarity is immaterial to the operation of the device,) the flow of current will be as follows: Leaving the source of supply Q the current flows over the conductor $l^7$ to the ground or equivalent conductor to the conductor $l^6$, which leads it to the motor-field $M^f$, and thence over the conductor $l^{13}$ to the contact $23^b$ of the push-button switch. A lamp $q^2$ is interposed across the terminals $23^b$ and $23^a$, its office being merely a resistance which being in series with the motor-field $M^f$ allows only a small amount of current to flow through the motor-field. From the contact $23^b$ the current flows through the lamp $q^2$ to the contact $23^a$ and thence by a stud $13^a$ to the contact 13 on the reversing-switch. If the contact 13 is connected to 14, as shown, the current will flow from the contact 14 out over the conductor $l^{12}$ to the conductor $l^{11}$ and over the latter to the contact $5^d$ on the automatic switch, across by the knife 6 to contact $5^c$, thence by conductor $l^{10}$ to push-button contact $24^b$, and across $24^a$ by bridge 24, thence by stud $12^a$ to contact 12 on reversing-switch, and thence by knife 20 to contact 15 and over conductor $l^{17}$ back to source of supply Q. It will be noted that the resistance $q^2$ is in series with the motor-field $M^f$. When the button $22^a$ is pressed down, bridging the contacts $23^a$ and $23^b$, the resistance $q^2$ is bridged, allowing full current to flow through field $M^f$. The lamp $q^2$ prevents excessive sparking, which would occur between the knife 23 and the contacts $23^a$ and $23^b$ if the full circuit were completely broken suddenly. It should be noted that the armature $M^a$ is short-circuited, the conductor $l^{11}$, knife 6, conductor $l^{10}$, bridge 24, and conductors $l^9$ and $l^8$ forming a complete loop across the terminals. This serves as a brake to stop the motor. The field being slightly excited, any motion of the armature causes it to generate current through the short circuit. This short circuit can only occur when the knife 6 is in its central position, which is only when the recess in the switch-operating cam is in line with the switch-crank, as previously described. Hence the motor is automatically locked in this position and cannot be started again until the short circuit is broken by pushing the push-button and breaking the short circuit between the contacts $24^a$ and $24^b$. It will be noted that the contacts $24^a$ and $24^b$ are directly in series with the contacts $5^c$ and $5^d$ of the automatic switch. Should the reversing-switch be thrown so as to connect contacts 12 with 13 and 14 with 15, the conditions would not be changed, as the armature $M^a$ will then be short-circuited, as before, and the circuit through the motor-field $M^f$ and the lamp $q^2$ will not be changed as far as the contact 13. From thence it will continue across to contact 12, thence across the bridge 24, along the conductor $l^{10}$ to bar 6, and by conductors $l^{11}$ and $l^{12}$ to contact 14, thence across to 15, and return by conductor $l^{17}$ to the source of supply Q. If the reversing-switch knives 19 and 20 do not bridge any of the contacts together, then the field-circuit is entirely broken at contact 13 and the motor cannot be started. The switch is then in the "off" position. Assuming that the reversing-switch is in the position shown in the drawings, to start the motor it is only necessary to press the button $22^a$, when the armature short circuit is broken between $24^a$ and $24^b$ and the main circuit is established between $23^a$ and $23^b$. The circuit is then as follows: Q to $l^7$, $l^6$, $M^f$, (motor-field,) $l^{13}$, $23^b$, 23, $23^a$, $13^a$, 13, 19, 14, $l^{12}$, $M^a$, (motor-armature,) $l^8$, $l^9$, 12, 20, 15, $l^{17}$ to Q. The motor at once revolves in a predetermined direction (according to the polarity in which the motor-field $M^f$ is connected) and the automatic switch-operating cam immediately throws the switch-knife in the position shown by dotted lines, bridging contacts $5^e$ and $5^f$. Since these contacts are in multiple with $23^b$ and $23^a$, ($5^e$ directly with $23^b$ and $5^f$ with $23^a$ by the knife 19,) the button $22^a$ may be released and the motor will continue to run, the circuit then being $l^7$, $l^6$, $M^f$, $l^{13}$, $5^e$, 6, $5^f$, $l^{11}$, $M^a$, $l^8$, $l^9$, 12, 20, 15, $l^{17}$ to Q. When the switch-operating cam has made one revolution, its recess allows the spring 11 to throw the knife 6 back across contacts $5^c$ and $5^d$, and the push-button $22^a$, having been previously released, already connects contacts $24^a$ and $24^b$. Thus the motor-circuit is broken between $5^e$ and $5^f$ (lamp-resistance $q^2$ is in multiple with these contacts also and prevents sparking here) and the armature short-circuited through $24^a$ and $24^b$ and $5^c$ and $5^d$, preventing the momentum of the motor from carrying the recess in the cam beyond the position shown in Fig. $6^a$, which would reëstablish the circuit. To reverse the motor and operate the end-cell switch in the other direction, the reversing-switch is turned so that contact 12 is connected to 13 and 14 to 15. The button is pressed down and the circuit is as follows: $l^6$, $M^f$, $l^{13}$, $23^b$, 23, $23^a$, 13, 20, 12, $l^9$, $l^8$, $M^a$, (note direction of flow through armature has been reversed and that the motor will run in the reverse direction, since the fields $M^f$ remain as before,) then by $l^{12}$ to 14, 19, 15, $l^{17}$ to Q. Since the direction of rotation of the motor has been changed, the operating-cam will rotate in an opposite direction, causing the knife of the automatic switch to bridge contacts $5^a$ and $5^b$. These contacts are now in multiple with contacts $23^a$ and $23^b$, ($5^a$ direct with $23^b$ and $5^b$ by the knife 20, bridging contacts 12 and 13.) Hence the button may be released, and the motor will continue to run until the cam has completed its revolution. The circuit is then $l^6$, $M^f$, $l^{13}$, $5^a$, 6, $5^b$, $l^{14}$, $l^8$, $M^a$, $l^{12}$, 14, 19, 15, $l^{17}$ to Q. The contacts $5^a$ and $5^b$ are also in shunt relation to the resistance lamp $q^2$, which prevents injurious sparking when the knife 6 breaks its connection across $5^a$ and $5^a$.

Referring to Figs. 17, 18, 19, 20, and 21, the construction of the combination push-button switch and reversing-switch is as follows: To a suitable insulating-base V (this may be the switchboard itself) are placed, ninety degrees apart, the four contact-blocks 12 13 14 15. These are fastened to the base V by projecting studs passing through the base V and brazed into the contacts and having binding-nuts on the opposite face of base V. These studs project beyond the inside of the base and support an auxiliary base 16, of slate or other suitable insulating material, its object being to support the contacts $24^a$ and $24^b$ on its outer face and contacts $23^a$ and $23^b$ on its inner face. Contacts $23^a$ and $23^b$ are placed diametrically opposite each other and contacts $24^a$ and $24^b$ are likewise diametrically opposite. The line of contacts $23^a$ and $23^b$ is at right angles to the line of contacts $24^a$ and $24^b$. The contacts $24^a$ and $23^a$ have extended bases which bolt in with the studs $12^a$ and $13^a$, respectively, thereby connecting contact $24^a$ directly with contact 12 and contact $23^a$ with contact 13. Through the center of the base V is a hole over which and concentric with it is bolted a hollow stud 17 by bolts which pass through the base V and also fasten a guide-plate $22^c$ to its inside face. The object of stud 17 is to form a journal for the hand-wheel 18 to turn on, and this hand-wheel, which is of suitable insulating material, is bushed with the metal bushing $18^a$. Lock-nuts $17^a$ and $17^b$ hold the hand-wheel in place. The hand-wheel has bolted to its inside face two contact-bars, whose ends project, forming contact-knives ninety degrees apart and arranged to engage with the contacts 12, 13, 14, and 15. The knife $20^a$ is made slightly longer than the other three, and stops $12^b$ and $15^b$ are placed upon the sides of contact-blocks 12 and 15, respectively, as shown. These blocks are placed far enough out from the axis of the switch to allow all the contact-knives to clear the stops $12^b$ and $15^b$, except the knife $20^a$, which will not clear, its motion being limited by the stop $12^b$ in one direction and the stop $15^b$ in the opposite direction. A pointer 21, attached to the knife $26^a$, indicates its position by marks "Raise," "Off," and "Lower" upon the base V.

22 is the main rod of the push-button and is capped upon its outside end by the button $22^a$, of vulcanite or other suitable material. A guide $22^d$ is placed in the hand-wheel, through which the button $22^a$ projects, and a hole in the center of the guide-plate $22^e$ guides the rod 22, which passes through it. Beyond this the rod 22 is extended by the rod $22^b$, of insulating material, and is of sufficient length to reach from the guide-plate $22^e$, projecting out through the auxiliary base 16, far enough to enable the contact-knife to be attached to it when the knife is in contact with the blocks $24^a$ and $24^b$. The contact-knife 23 is attached to the rod $22^b$ inside the base 16 and far enough up that it will not come into contact with the blocks $23^a$ and $23^b$ until the knife 24 has been cleared to contacts $24^a$ and $24^b$. The button $22^a$ is made long enough to project beyond the guide-plate $22^d$ far enough to give sufficient longitudinal motion to the rod $22^b$ to enable knife 23 to make its contact. A compression-spring $22^c$, acting between the button $22^a$ and the guide-plate $22^e$, keeps the button normally in its outward position and contacts $24^a$ and $24^b$, bridged by the knife 24. 25 is a guide for maintaining the alinement of the rod $22^b$.

Fig. 15 is a diagram showing the connections of the motor-controlling switches when an automatic brake is used to stop the motor instead of having its armature short-circuited. In this diagram, $a$ is the shaft of the motor, which is extended and carries a drum $a'$, which is gripped by the brake-shoes 26 and $26^a$. At one end of the levers is the tension-spring 28, which tends to draw the two levers together and keep the brake on. At the opposite end is an electromagnet 27, which when excited is strong enough to overcome the spring 28 and attracts the two levers, thereby releasing the brake. The magnet 27 is connected in series with the motor, so that when the motor-current is on the magnet holds the brake off and when the motor-circuit is broken the spring 28 holds the brake on. The wiring of the switches in the diagram Fig. 15 is the same as already described in Fig. 16, except that since the armature does not have to be short-circuited in combination with the automatic brake contacts $5^c$ and $5^d$ on the automatic switch and contacts $24^a$ and $24^b$ on the push-button switch are not connected to the circuit and are mere "dummies."

In the detailed drawings of the brake, Figs. 12, 13, and 14, 29 is a bracket, which is bolted to the pedestal 1 and upon which the magnet rests, being held by screws, the bolts $26^b$ and $26^c$ serving the double purpose of fastening the bracket to the frame 1 and of acting as fulcrums for the jaws 26 and $26^a$. The lugs on the pedestal 1 are shown in Figs. 8 and 9. The periphery of the drum $a'$, which is keyed to the shaft $a$, is grooved, as shown in Fig. 14, with wedge-shaped grooves, and the gripping-faces of the arms 26 and $26^a$ are correspondingly grooved in female relation to the drum, thereby much increasing the friction of the clutch. From the lower ends of the jaws 26 and $26^a$ lugs extend outward, and the tension-spring 28 is hung between by the hook-bolts 33 and $33^a$. By means of the nuts on the outer ends of these hook-bolts the tension of the spring may be regulated. The upper ends of the levers are enlarged, extending over the ends of the magnet, and form armatures between which the magnet rests. The magnet shown is of the "iron-clad" type, having an iron core 31, around which is the magnet-winding 27. The magnetic circuit is completed through the armatures of 26 and 26ª and through the cylindrical iron casing 32, which incloses the coil. 30 is a block of insulating material which carries binding-posts for convenience in connecting the magnet in circuit.

Figs. 7, 8, 9, 10, and 11 show a mechanical modification of the mechanism for operating the automatic interlocking switch controlling the motor, the modifications applying to the constructions shown in Figs. 6$^b$, 6$^c$, 6$^d$, and 6$^e$. In the modification the journal-pin 7 is abolished and the construction made much more compact by utilizing the extension of the main shaft G' for its purpose. The crank-sleeve 6$^a$ bears directly in the pedestal 4, as shown in the horizontal section, Fig. 7, end thrust being prevented by an enlargement in the diameter inside of the pedestal and the washer and lock-nuts 6$^f$, 6$^g$, and 6$^h$ outside of the pedestal. The extended main shaft G' rotates in the center of the sleeve 6$^a$; but the sleeve 6$^a$ is prevented from rotating with it by the tension-spring 11. The pinion 8 on this shaft G' meshes in this case with an external gear 9$^a$ instead of an internal gear, and the gear and cam 9 being fastened together rotate together upon the pin 10, which is fastened to a lug on pedestal 1. Fig. 9 shows the relation of the cam to the crank 6$^d$ and the action of the gears. Fig. 10 shows the normal position assumed upon the rotation of the cam 9. The operation of this modification is identical with that of the former figures, and their description applies equally to this modification.

To automatically break the motor-circuit and stop the motor to prevent injury when the brush has traveled to the end of the switch, I have arranged a device (shown in Figs. 32 and 33 and in diagram in Fig. 34) consisting of two make-and-break devices, situated one at each end of the switch and which are actuated by a trip attached to the main brush. The make-and-break devices are included in the motor-circuit and are connected with the reversing-switch in such a way that only the device upon the end of the switch toward which the brush is traveling is in circuit to affect the operation of the motor. When the brush travels toward this end to the limit of its motion, the trip attached to it actuates the make-and-break device and automatically breaks the circuit, making it impossible for the motor to move the brush any farther in this direction. In carrying out this idea I attach to the nut H a plate 34, having a lug at each end, one of which carries the outward projecting stud 35 and the other the outward projecting stud 35$^a$. The amount of outward projection of these studs can be regulated by means of lock-nuts upon them binding the lugs of the plate. Fig. 32 shows the brush at the A$^2$ end of the switch moving in the direction of the arrow, the stud 35 in the act of operating the circuit-breaker. The circuit-breaker is mounted upon a suitable base 37, which is attached to but insulated from the frame A$^2$, and consists of a knife-lever 39, pivoted upon the binding-post 44, so that it swings in and out of contact with the contact-brush 38, which is fixed to the base 37, but insulated from it. The knife-lever is supplied with an overbalancing-spring 40, which holds the knife in the contact 38 or holds it out of contact, according to which way it has been thrown. The breaker is included in circuit by means of the binding-post 44 on the knife-lever and the binding-post 43 on the contact-brush 38. The lever 39 has a bell-crank arm 47, upon which the end of the stud 35 engages and throws the knife out of the contact 38, in which position it is held by the overbalancing-spring 40 until the main brush is moved in the opposite direction, when a projecting arm 36, which is fastened to the stud 35, engages with the third arm 42 of the lever 39, throwing it back into the contact 38, where it is held by the overbalancing-spring. The projecting arm 36 is secured to the stud 35 by means of lock-nuts, so that its position may be adjusted. Upon the opposite end is a similar circuit-breaking device actuated by the stud 35$^a$ and the projecting arm 36$^a$. The action is the same, and the parts are designated by the same numerals, the letter "$a$" being affixed.

Referring to the diagram Fig. 34, it will be seen that the contact 15 (shown in Figs. 15 and 16) on the hand reversing-switch is replaced by two contacts 15$^x$ and 15$^y$ and that the conductor $l^{15}$ is divided into two branches, one of which terminates in 15$^x$ and the other in 15$^y$. The branch terminating in 15$^x$ includes the breaker 38 39 and the branch terminating in 15$^y$ includes the breaker 38$^a$ 39$^a$. The contacts 15$^x$ and 15$^y$ are placed so that when the reversing-switch is in the position shown the contact 15$^x$ is connected to contact 12 by the bar 20. The contact 15$^y$ is then out of circuit. The reversing-switch is now in the position to drive the main brush toward the breaker 38 39 in the direction of the arrow. This it can do until it has gone far enough toward the end of the switch to open the breaker 38 39, and thus render the motor inoperative any further in this direction. In reversing the switch bar 19 connects the contacts 15$^y$ and 14, leaving the contact 15$^x$ disconnected, bar 20, of course, connecting 12 and 13. The motor is then free to move the main brush toward the breaker 38$^a$ 39$^a$, and in doing so closes the breaker 38 39. Both breakers being closed, the motor may be run in either direction at will by means of the reversing-switch, but only within the limits established by the position of the breaker 38 39 in one direction and the breaker 38$^a$ 39$^a$ in the other direction.

Referring to Figs. 35 and 36, supports 100 are provided for the intermediate portion of the screw G, which prevent it from sagging in cases where such supports are necessary by reason of the great number of contacts and the consequent increased length of the screw. These supports are attached to or made part of a carriage 101, adapted to run on tracks or ways 102, applied to the frame of the switch. The supports 100 are not threaded for the screw G, and longitudinal motion is imparted to them and to the carriage 101 by the nut H or other part of the movable member of the switch. The supports 100 are placed far enough apart to insure the presence of one of them at or near the middle of the screw when the other has been pushed to the end of the switch by the nut H. The nut is free to move between the supports without imparting motion to the carriage.

The described provision of the driving mechanism of the end-cell switch with a hand starting-switch obviates undesirable reversals of direction of motion of the driving mechanism, so that the end-cell switch is prevented from oscillating between two of its contacts and a battery-voltage free from such fluctuations as such oscillation would produce and of any desired value may at will be obtained. The arresting devices described act to arrest said mechanism in such a way that the brush is in proper position in respect to that contact with which it is making connection.

It will be obvious to those skilled in the art to which my invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. In an end-cell switch and in combination with the main brush and its contacts, an auxiliary carbon brush which constitutes a path of high resistance by which adjoining cells are connected through the varying resistance of the carbon brush as the main brush passes from contact to contact.

2. In an end-cell switch the combination with the contact of a brush having its end portion twisted in respect to its shank portion substantially as described to distribute wear on the contacts.

3. In an end-cell switch having a contact-rail and a line of contacts two brush members constituting a single brush and whereof each bridges the contact-rail and the line of contacts and whereof one rides on the top face and the other on the bottom face of the same, substantially as described.

4. In an end-cell switch having a contact-rail and a line of contacts two brush members constituting a single brush and whereof each bridges the contact-rail and the line of contacts and whereof one rides on the top face and the other on the bottom face of the same, and means for combining the two brush members on said rail and contacts, substantially as described.

5. In an end-cell switch, the combination of a carbon brush with conductors embedded in and penetrating nearly to its working surface, substantially as described.

6. In an end-cell switch a carbon brush in combination with conducting-supports embedded in it and penetrating nearly to its working surface, whereby its conductivity is equalized and increased.

7. In an end-cell switch, the combination with the fixed contact-blocks of guide-pieces detachably connected thereto, substantially as described.

8. In an end-cell switch, the combination of a fixed contact-block having a bolt-hole near its shank and a bolt-slot in its front edge, guide-pieces having bolt-slots near their inner edges and bolt-holes near their outer edges, and bolts and insulating-thimbles, substantially as described.

9. In an end-cell switch, the combination of fixed contact-blocks with guide-pieces carried thereby and insulated therefrom, substantially as described.

10. In an end-cell switch, the combination of the brush-shifting mechanism, means for manually operating the same, a motor and its gearing for driving said shifting mechanism, and devices for connecting and disconnecting the shifting mechanism and the gearing, substantially as described.

11. The combination with the numerous contacts of an end-cell switch and with the brush which travels over them and is out of range of distinct vision of the operator, of means for controlling the shifting and positioning of the brush, a brush-position indicator located near said means and in range of distinct vision of the operator, and connections between the brush and indicator, whereby the movements of the brush and its proper position in respect to the various contacts are exhibited within the range of distinct vision of the operator when in position for manipulating said means, substantially as described.

12. The combination with an end-cell switch having numerous contacts and a brush and means for shifting the brush, of a brush-position indicator adapted to indicate the number of cells in circuit and provided with means for indicating the brush's approach to and recession from, as well as its coincidence with the center of each contact, substantially as described.

13. The combination with a generating plant and its complemental controlling and indicating instruments located at a point of control, of a battery, an end-cell switch provided with a brush and with contacts and located near the battery, means for driving the switch, devices at the point of control for indicating the position of the brush in respect to the contacts, and means located at the point of control for manually controlling the operation of the switch.

14. The combination with the driving mechanism of an end-cell switch, of a hand starting-switch obviating undesirable reversals of direction of motion of the driving mechanism whereby the end-cell switch is prevented from oscillating between two of its adjacent contacts and a battery-voltage free from such fluctuations as such oscillation would produce and of any desired value may at will be obtained, and devices for automatically arresting said mechanism, substantially as described.

15. The combination in an end-cell switch of an electric motor for driving it, and means for short-circuiting the armature of the motor to arrest the switch in proper position, substantially as described.

16. The combination of an end-cell switch, an electric motor for driving the end-cell switch, a circuit for the motor, a hand starting-switch obviating undesirable reversals of direction of motion of the motor whereby the end-cell switch is prevented from oscillating between two of its adjacent contacts and a battery-voltage free from such fluctuations as such oscillation would produce and of any desired value may at will be obtained, and means for automatically arresting the motor, substantially as described.

17. The combination in an end-cell switch, of mechanism including an arresting-switch for arresting the end-cell switch, a follower for controlling said arresting-switch, and a cam coöperating with the follower and operatively connected with a movable part of the end-cell switch, substantially as described.

18. The combination in an end-cell switch, of a reversing and stopping switch, a follower for actuating the reversing and stopping switch, and a cam having a part for permitting the switch to rest in a neutral position and a part for throwing and maintaining the switch in either operative position, substantially as described.

19. The combination of an end-cell switch, a motor for driving it, a power-supply for the motor, a hand starting-switch obviating undesirable reversals of direction of motion of the motor whereby the end-cell switch is prevented from oscillating between two of its adjacent contacts and a battery-voltage free from such fluctuations as such oscillation would produce and of any desired value may at will be obtained, a hand-switch for controlling the direction of motion of motor, and an auxiliary controlling device operated by the switch for permitting the motor to run and also for stopping it subsequent to the release of the hand starting-switch, substantially as described.

20. The combination in an end-cell switch of a motor for driving it, a power-supply for the motor, a hand starting-switch obviating undesirable reversals of direction of motion of the power-supply whereby the end-cell switch is prevented from oscillating between two of its adjacent contacts and a battery-voltage free from such fluctuations as such oscillation would produce and of any desired value may at will be obtained, and an auxiliary controlling device operated by the cell-switch for permitting the motor to run and also for stopping it subsequent to the release of the hand-switch, substantially as described.

21. The combination in an end-cell switch of a motor for driving it, a hand starting-switch obviating undesirable reversals of direction of motion of the motor whereby the end-cell switch is prevented from oscillating between two of its adjacent contacts and a battery-voltage free from such fluctuations as such oscillation would produce and of any desired value may at will be obtained, an automatic running and stopping switch operatively connected with the end-cell switch, and circuits substantially as described connected through said switches.

22. In an end-cell switch the combination of an electric motor for driving it, two stopping-switches arranged in series and whereof one is operated manually and the other mechanically, two reversing-switches arranged in series and whereof one is operated manually and the other positively, a manually-operated starting-switch in parallel with the positively-operated reversing-switch, and circuit connections for connecting said switches and motor, substantially as described.

23. In an end-cell switch the combination of an electric motor for driving it, two stopping-switches arranged in series and whereof one is operated manually and the other mechanically, two reversing-switches arranged in series and whereof one is operated manually and the other positively, a manually-operated starting-switch in parallel with the positively-operated reversing-switch, circuit connections for connecting said switches and motor, and means for stopping the motor upon the interruption of the current by the positively-operated switch, substantially as described.

24. The combination of the driving-motor of an end-cell switch with a controlling-switch consisting of a reversing-switch and a starting-switch arranged concentrically with the reversing-switch, and circuit connections, substantially as described.

25. The combination of the driving-motor of an end-cell switch with circuit connections and with a controlling-switch consisting of a base, an auxiliary base having contacts on its respective faces, an endwise-movable rod carrying contact-bridges coöperating with said contacts, a reversing-switch on the base, and studs connecting the bases, substantially as described.

26. In an end-cell switch the combination of a movable element, a switch-lever an overbalance-spring for the switch-lever, a projection and bifurcated part interposed between the element and lever, substantially as described.

27. In an end-cell switch the combination of a motor, a movable element, two bifurcated switch-levers for controlling the end travel of the movable element, means on the movable element for engaging opposite parts of each of said levers to drive each of them in opposite directions, and a motor-circuit having branches each through and including one of said levers, whereby the same respectively serve to open and close the circuit through said branches, substantially as described.

28. In an end-cell switch the combination of a movable element, stopping devices for arresting its motion in either direction, and a reversing-switch provided with means for bringing the appropriate stopping device into action, substantially as described.

29. In an end-cell switch and in combination with its screw and movable member, a movable carriage spanning the movable member and provided with supports for the screw, substantially as described.

30. In an end-cell switch and in combination with its screw, a movable carriage provided with supports for the screw, substantially as described.

31. In an end-cell switch the combination with a movable member provided with a main brush and an auxiliary brush arranged crosswise of and extending beyond the main brush longitudinally in the line of contacts and carrying a part of high resistance between them, of a line of contacts and a bus-bar, substantially as described.

32. In combination an electric plant having the usual switchboard and battery and an end-cell switch having a motor for shifting its brush, a hand-switch for controlling the motor whereby the position of the brush is fixed by the operator and said hand-switch being located at a distance from the cell-switch to make it accessible at the switchboard to the operator, and connections extending from the hand-switch to the motor, substantially as described.

33. In an end-cell switch the combination with the fixed contact-blocks of guide-pieces of material that will wear uniformly with the blocks, substantially as described.

34. In an end-cell switch the combination with the main and auxiliary brushes and the fixed contact-blocks of guide-pieces located between adjacent contact-blocks and consisting each of a plurality of dummy blocks insulated from each other and from the contact-blocks, to prevent a short circuit between two brushes, substantially as described.

In testimony whereof I have hereunto signed my name.

JOSEPH APPLETON.

In presence of—
K. M. GILLIGAN,
W. J. JACKSON.